United States Patent
Hashimoto et al.

(10) Patent No.: US 7,542,202 B2
(45) Date of Patent: Jun. 2, 2009

(54) MICROSCOPE AND A CONTROLLING METHOD THEREOF

(75) Inventors: Yuichiro Hashimoto, Tokyo (JP); Hideyuki Kawanabe, Tokyo (JP)

(73) Assignee: Olympus Corporation, Tokyo (JP)

(*) Notice: Subject to any disclaimer, the term of this patent is extended or adjusted under 35 U.S.C. 154(b) by 309 days.

(21) Appl. No.: 11/397,981

(22) Filed: Apr. 5, 2006

(65) Prior Publication Data

US 2006/0227414 A1  Oct. 12, 2006

(30) Foreign Application Priority Data

Apr. 8, 2005  (JP)  ............................. 2005-112828
Feb. 15, 2006  (JP)  ............................. 2006-037566

(51) Int. Cl.
*G02B 21/00* (2006.01)

(52) U.S. Cl. ...................................... 359/381; 359/380
(58) Field of Classification Search .......... 359/382–383
See application file for complete search history.

(56) References Cited

U.S. PATENT DOCUMENTS

| | | | |
|---|---|---|---|
| 4,653,878 A | 3/1987 | Nakasato et al. | |
| 6,046,844 A | 4/2000 | Duis et al. | |
| 6,252,704 B1 | 6/2001 | Omi | |
| 6,366,398 B1 * | 4/2002 | Ouchi | ......................... 359/381 |

| | | | |
|---|---|---|---|
| 2002/0018291 A1 * | 2/2002 | Fukuyama | ................... 359/368 |
| 2004/0169915 A1 | 9/2004 | Yoneyama et al. | |

FOREIGN PATENT DOCUMENTS

| | | | |
|---|---|---|---|
| EP | 1 022 597 A2 | | 7/2000 |
| JP | 8-86965 A | | 4/1996 |
| JP | 2000056232 A | * | 2/2000 |
| JP | 2004-004856 | | 1/2004 |
| JP | 2004-226882 A | | 8/2004 |

OTHER PUBLICATIONS

English machine translation of JP2004004856A.*

* cited by examiner

*Primary Examiner*—Lee Fineman
(74) *Attorney, Agent, or Firm*—Frishauf, Holtz, Goodman & Chick, P.C.

(57) ABSTRACT

A microscope includes a switching mechanism which has a plurality of lens units, and which inserts a selected lens unit of the plurality of lens units into an observation light path and disposes the non-selected other lens units outside the observation light path. A control unit controls a movement speed of a stage, onto which a sample is placed, in an optical axis direction according to an observation power of the selected lens unit inserted into the observation light path. The plurality of lens units include: (i) a plurality of fixed-power lens units which are lens units including a combination of imaging lenses and objective lenses, and whose observation powers when observing the sample mutually differ, and (ii) a zoom lens unit which has a continuously changeable observation power.

12 Claims, 32 Drawing Sheets

| ATTACHMENT HOLE NUMBER WITHIN TURRET | 200 | 201 | 202 | 203 | 204 |
|---|---|---|---|---|---|
| LENS UNIT POWER | ×0.14 | ×0.27 | ×0.4 | ×0.9 | ×1.25~×12.5 |

FIG. 6

| LENS UNIT POWER | | ×0.14 | ×0.27 | ×0.4 | ×0.9 | ×1.25~×12.5 |
|---|---|---|---|---|---|---|
| FOCUSING SPEED | MICROMOTION | 3000 [μm/s] | 1200 [μm/s] | 500 [μm/s] | 200 [μm/s] | 80000/(POWER)² [μm/s] |
| | FLUTTER | 4000 [μm/s] | 3000 [μm/s] | 3000 [μm/s] | 3000 [μm/s] | 600000/(POWER)² [μm/s] |

F I G. 7

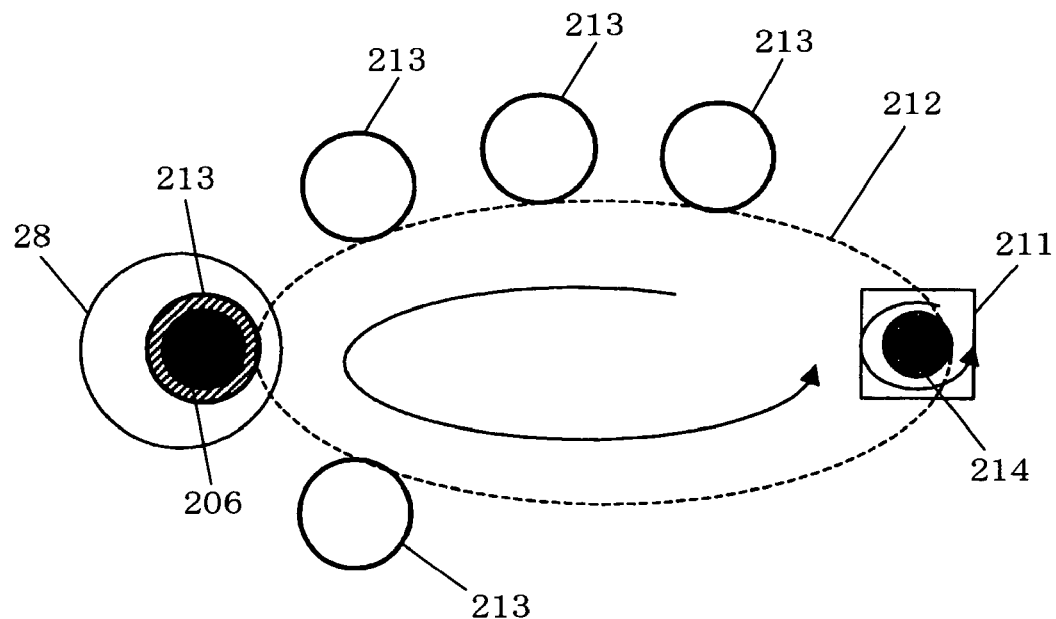
F I G. 8A

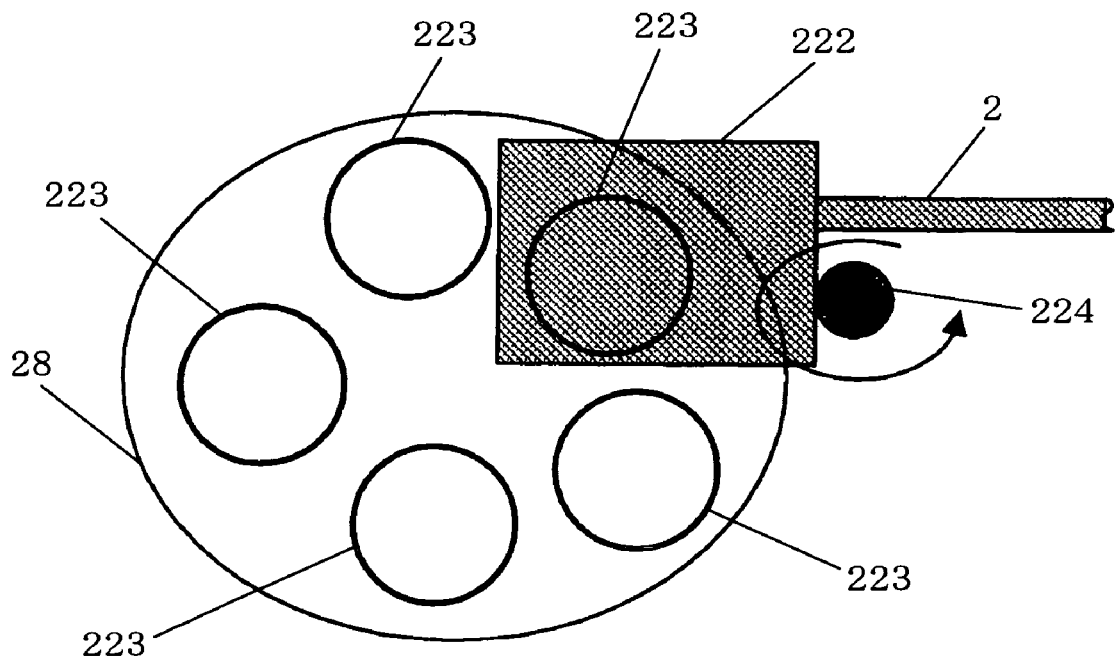
F I G. 10A

| LENS UNIT POWER | | ×0.14 | ×0.27 | ×0.4 | ×0.9 | ×1.25 ~ ×12.5 |
|---|---|---|---|---|---|---|
| FOCUSING SPEED | MICROMOTION | 3000 [μm/s] | 1200 [μm/s] | 500 [μm/s] | 200 [μm/s] | 80000/(POWER)²[μm/s] |
| | FLUTTER | 4000 [μm/s] | 3000 [μm/s] | 3000 [μm/s] | 3000 [μm/s] | 600000/(POWER)²[μm/s] |
| XY STAGE SPEED | MICROMOTION | 1720 [μm/s] | 890 [μm/s] | 600 [μm/s] | 300 [μm/s] | −19(POWER)+274 [μm/s] |
| | FLUTTER | 15000 [μm/s] | 15000 [μm/s] | 15000 [μm/s] | 12000 [μm/s] | −569(POWER)+7711 [μm/s] |

FIG. 17

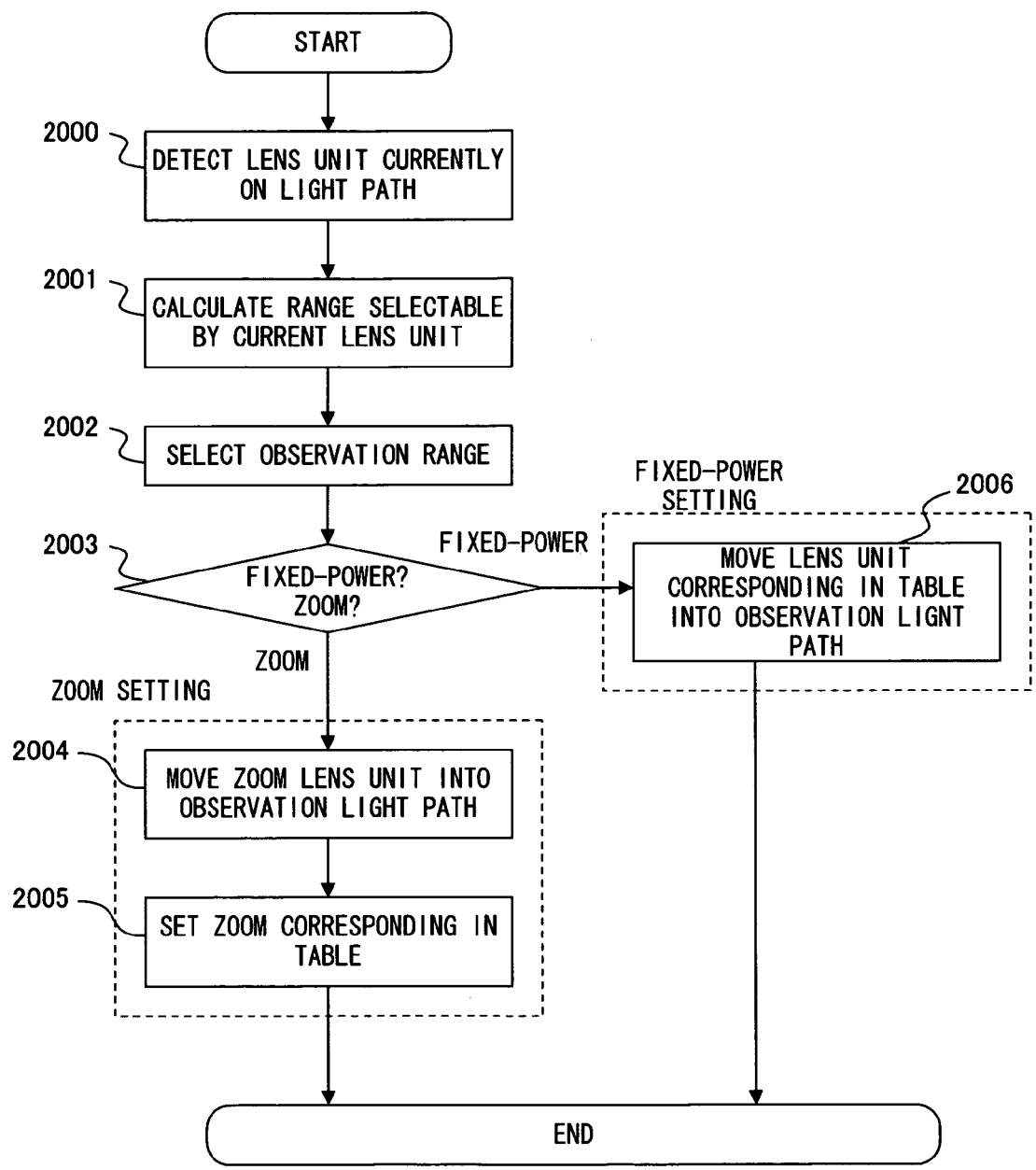
F I G. 1 8

| LENS UNIT | CORRESPONDING MAGNIFYING POWER | SELECTED OBSERVATION RANGE |
|---|---|---|
| 1x | 1x OR MORE, LESS THAN 2x | X:4080 ~ 2040<br>Y:3072 ~ 1536 |
| 2x | 2x OR MORE, LESS THAN 3x | X:2039 ~ 1360<br>Y:1535 ~ 1024 |
| 3x | 3x OR MORE, LESS THAN 4x | X:1359 ~ 1020<br>Y:1023 ~ 768 |
| 4x | 4x OR MORE, LESS THAN 5x | X:1019 ~ 816<br>Y:767 ~ 614 |
| ZOOM (MORE THAN 5x) | 5x OR MORE | X:815 ~<br>Y:613 ~ |

FIG. 20A

| LENS UNIT | CORRESPONDING MAGNIFYING POWER | SELECTED OBSERVATION RANGE |
|---|---|---|
| 2x | 2x OR MORE, LESS THAN 3x | X:4080 ~ 2720<br>Y:3072 ~ 2048 |
| 3x | 3x OR MORE, LESS THAN 4x | X:2719 ~ 2038<br>Y:2047 ~ 1536 |
| 4x | 4x OR MORE, LESS THAN 5x | X:2037 ~ 1632<br>Y:1535 ~ 1229 |
| ZOOM (MORE THAN 5x) | 5x OR MORE | X:1631 ~<br>Y:1228 ~ |

FIG. 20B

| LENS UNIT | CORRESPONDING MAGNIFYING POWER | SELECTED OBSERVATION RANGE |
|---|---|---|
| 3x | 3x OR MORE, LESS THAN 4x | X: 4080 ~ 3060<br>Y: 3072 ~ 2304 |
| 4x | 4x OR MORE, LESS THAN 5x | X: 3059 ~ 2448<br>Y: 2303 ~ 1844 |
| ZOOM (MORE THAN 5x) | 5x OR MORE | X: 2447 ~<br>Y: 1843 ~ |

FIG. 20C

| LENS UNIT | CORRESPONDING MAGNIFYING POWER | SELECTED OBSERVATION RANGE |
|---|---|---|
| 4x | 4x OR MORE, LESS THAN 5x | X:4080 ~ 3264<br>Y:3072 ~ 2458 |
| ZOOM (MORE THAN 5x) | 5x OR MORE | X:3263 ~<br>Y:2457 ~ |

FIG. 20D

| LENS UNIT | CORRESPONDING MAGNIFYING POWER | SELECTED OBSERVATION RANGE |
|---|---|---|
| ZOOM (MORE THAN 5x) | 5x OR MORE | X:4080 ~<br>Y:3072 ~ |

FIG. 20E

| LENS UNIT | CORRESPONDING MAGNIFYING POWER | SELECTED OBSERVATION RANGE |
|---|---|---|
| 1x | 1x OR MORE, LESS THAN 1.5x | X:4080 ~ 2720<br>Y:3072 ~ 2048 |
| 2x | 1.5x OR MORE, LESS THAN 2.5x | X:2719 ~ 1632<br>Y:2047 ~ 1229 |
| 3x | 2.5x OR MORE, LESS THAN 3.5x | X:1631 ~ 1166<br>Y:1228 ~ 878 |
| 4x | 3.5x OR MORE, LESS THAN 4.5x | X:1165 ~ 907<br>Y:877 ~ 683 |
| ZOOM (MORE THAN 5x) | 4.5x OR MORE | X:906 ~<br>Y:682 ~ |

FIG. 22

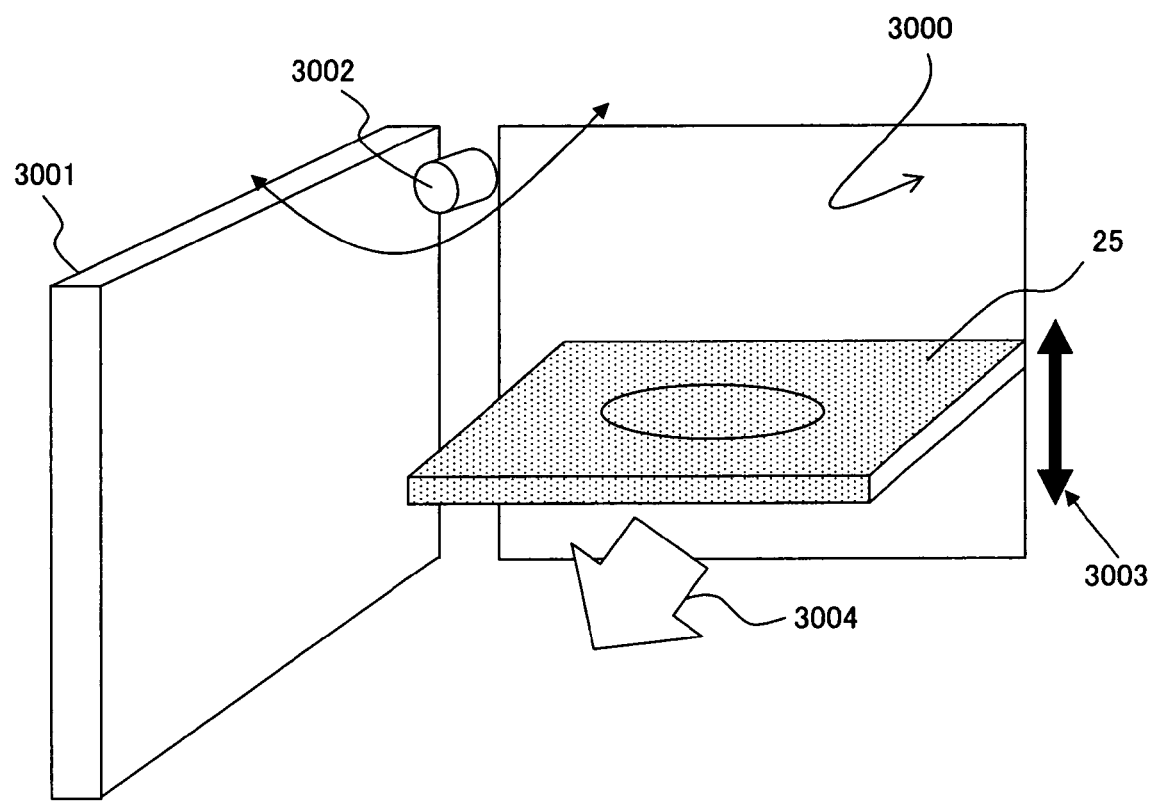
F I G. 24

MICROSCOPE AND A CONTROLLING METHOD THEREOF

CROSS REFERENCE TO RELATED APPLICATIONS

This application claims benefit of Japanese Applications No. 2005-112828, filed Apr. 8, 2005, and NO. 2006-37566, filed Feb. 15, 2006, the contents of which are incorporated by this reference.

BACKGROUND OF THE INVENTION

1. Field of the Invention

The present invention relates to a technology suitable for implementation in a microscope which comprises a low-powered lens unit, composed of a combination of a plurality of imaging lenses and objective lenses, and a continuously variable zoom unit, which realizes low magnification to high magnification, and performs electrical control of the switching of the lens unit and the movement speed of an observation subject.

2. Description of the Related Art

Due to improvement in the power of microscopes and sharp imaging technology, it is becoming possible to perform observation of sites as desired by the observer. However, it is becoming important not only to view the sites, but to also observe the interaction between cells, with focus on cell-level to tissue-level observation. Therefore, a microscope is required which can freely perform the observation of cells, observed at an extremely high magnification, to the observation of tissue, observed at a lower magnification, can further freely perform observation of the overall image of an organism, observed at an extremely low power, and can observe inter-cell information transmission which cannot be known through observation of a single cell. Thus, there is a need for a microscope which can freely perform low-powered observation to high-powered observation.

Current microscopes are electrically controlled and are very convenient. By the implementation of electrical control, the operator can smoothly adjust observation power, focus, and aperture, and furthermore, perform automatic control by setting observation conditions. Therefore, not only experienced operators, but also first-time operators, can be assured superior operation.

Consequently, electric focusing devices which electrically control low magnification to high magnification have been recently developed.

For example, in the Japanese Laid-Open Patent Publication No. (Heisei) 8-86965, a microscope having a revolving-type objective lens conversion mechanism, which automatically changes the speed at which a focusing mechanism is driven according to the currently observed objective lens power, is proposed. According to this proposal, the driving speed of the focusing mechanism is configured to be low when the objective lens power is high, and in addition, the driving speed of the focusing mechanism is configured to be high when the objective lens power is low. In this way, a microscope examiner can consistently perform focusing and operations in the same way, even when the magnifying power of the observation optical system is changed.

In addition, in the Japanese Laid-Open Patent Publication No. 2004-226882, a microscope which determines observation power by the combination of a continuously variable zoom mechanism and objective lens and to which the above-mentioned focusing mechanism speed control is applied is proposed.

In the proposed microscopes described above, the speed of the focusing mechanism is uniquely determined to be a value set in advance by the power of the observation optical system. In addition, the calculation of magnifying power from observation imaging is particularly effective when the observation subject is small.

SUMMARY OF THE INVENTION

A microscope, which is one embodiment of the present invention, comprises the following: a plurality of fixed-power lens units which are lens units composed of a combination of imaging lenses and objective lenses, of which the observation power when observing a sample mutually differs; a zoom lens unit which is a lens unit which can continuously change observation power; a switching mechanism for switching a lens unit inserted into an observation light path and inserting any one of the other lens units into the observation light path; and a control unit for controlling the movement speed of a stage, onto which the sample is placed, in an optical axis direction according to the observation power of the lens unit inserted into the observation light path.

In addition, a microscope, which is another embodiment of the present invention, comprises the following: a plurality of fixed-power lens units which are lens units composed of a combination of imaging lenses and objective lenses, of which the observation power when observing a sample mutually differs; a zoom lens unit which is a lens unit which can continuously change observation power; a switching mechanism for switching a lens unit inserted into an observation light path and inserting any one of the other lens units into the observation light path; a display unit for displaying an observation image of the sample; a partial area acquisition unit for acquiring the setting results of a partial area configured for the observation image displayed in the display unit; and a selection unit for selecting a lens unit according to the setting result of the partial area, wherein the switching mechanism inserts the lens unit selected by the selection unit into the observation light path.

In addition, a microscope, which is still another embodiment of the present invention, comprises the following: a housing chamber in which a sample, which is an observation subject, is housed, with a stage onto which the sample is placed, and hermetically sealed; a detection unit for detecting the opening of the housing chamber; and a movement control unit for moving the position of the stage when the opening of the housing chamber is detected.

In addition, a controlling method of a microscope, which is still another embodiment of the present invention, wherein the microscope comprises a plurality of fixed-power lens units which are lens units composed of a combination of imaging lenses and objective lenses, of which the observation power when observing a sample mutually differs, and a zoom lens unit which is a lens unit which can continuously change observation power, performs the following: acquires information on the observation power of a lens unit inserted into the observation light path; and controls the movement speed of a stage, onto which a sample is placed, in the optical axis direction according to the observation power of the lens unit inserted into the observation light path.

In addition, a controlling method of a microscope, which is still another embodiment of the present invention, wherein the microscope comprises a plurality of fixed-power lens units which are lens units composed of a combination of imaging lenses and objective lenses, of which the observation power when observing a sample mutually differs, and a zoom lens unit which is a lens unit which can continuously change observation power, performs the following: acquires the setting results of a partial area configured for an observation image of the sample; selects a lens unit according to the setting result of the partial area; and inserts the selected lens unit into the observation light path.

In addition, a controlling method of a microscope, which is still another embodiment of the present invention, wherein the microscope comprises a housing chamber in which a sample, which is an observation subject, is housed, with a stage onto which the sample is placed, and hermetically sealed, performs the following: detects the opening of the housing chamber; and moves the position of the stage when the opening of the housing chamber is detected.

BRIEF DESCRIPTION OF THE DRAWINGS

The present invention will be more apparent from the following detailed description when the accompanying drawings are referenced.

FIG. 6 is a diagram showing an example of the magnifying power of a lens unit set in the attachment hole of the turret;

FIG. 7 is a diagram showing a setting example of the focusing speeds corresponding to each lens unit;

FIG. 8A is a diagram of the schematic configuration of a first modified example of a lens switching mechanism, viewed from above;

FIG. 10A is a diagram of the schematic configuration of a light path switching mechanism, viewed from above;

FIG. 17 is a diagram showing a setting example of the focus speeds and XY stage speeds corresponding to each lens unit;

FIG. 18 is a flowchart showing a control operation in a third embodiment of the present invention;

FIG. 20A is a diagram (1) showing an example of a table used to decide the lens unit to be implemented in an image observation in a selected observation range;

FIG. 20B is a diagram (2) showing an example of the table used to decide the lens unit to be implemented in the image observation in the selected observation range;

FIG. 20C is a diagram (3) showing an example of the table used to decide the lens unit to be implemented in the image observation in the selected observation range;

FIG. 20D is a diagram (4) showing an example of the table used to decide the lens unit to be implemented in the image observation in the selected observation range;

FIG. 20E is a diagram (5) showing an example of the table used to decide the lens unit to be implemented in the image observation in the selected observation range;

FIG. 22 is a diagram (6) showing an example of the table used to decide the lens unit to be implemented in the image observation in the selected observation range;

FIG. 24 is a diagram showing the configuration of a sample housing chamber; and

DESCRIPTION OF THE PREFERRED EMBODIMENTS

Hereinafter, embodiments according to the present invention are described, with reference to the drawings.

First Embodiment

Figure 1:
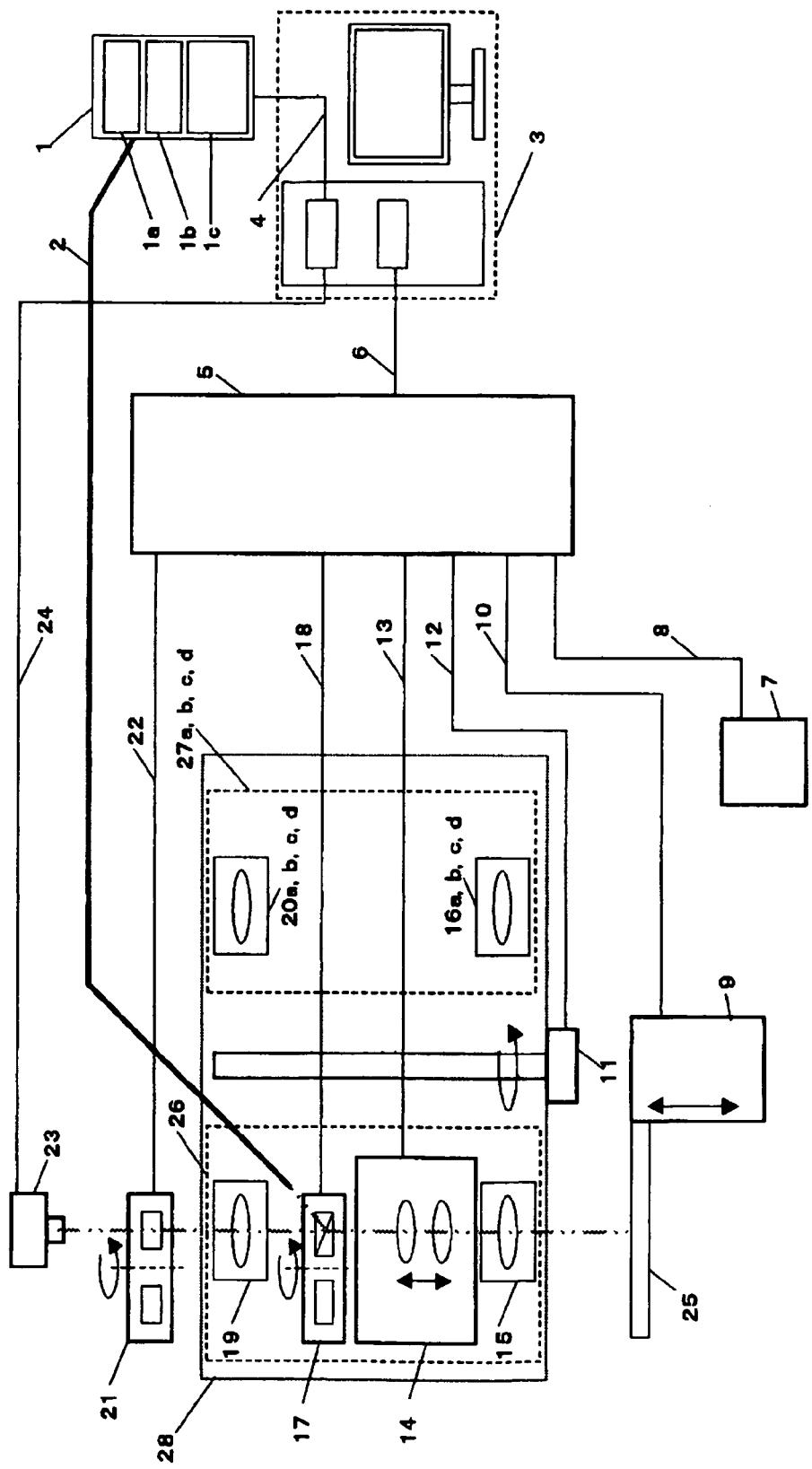
FIG. 1 is a diagram showing a first example of the schematic configuration of a microscope implementing the present invention.

FIG. 1 shows the schematic configuration of a microscope device according to the present embodiment.

In FIG. 1, a continuously variable zoom unit 26 is inserted into an observation light path.

A fluorescent light source device 1 has a fluorescent lamp 1c therewithin and also comprises an excitation shutter 1b and an excitation filter 1a. The fluorescent light source device 1 irradiates excitation light onto the main body of the microscope via a fiber 2. The light transmitted by the fiber 2 enters from a cube 17 within a turret 28 only when a continuously variable zoom unit 26 is inserted into an observation light path. A plurality of low-powered lens units 27a, b, c, and d, wherein imaging lenses and objective lenses are combined, and the continuously variable zoom unit 26 are mounted on the turret 28. These lens units and the zoom unit are controlled by a motor within a turret electrical unit 11 (not shown) and can be inserted into the observation light path selectively.

Figure 2A:
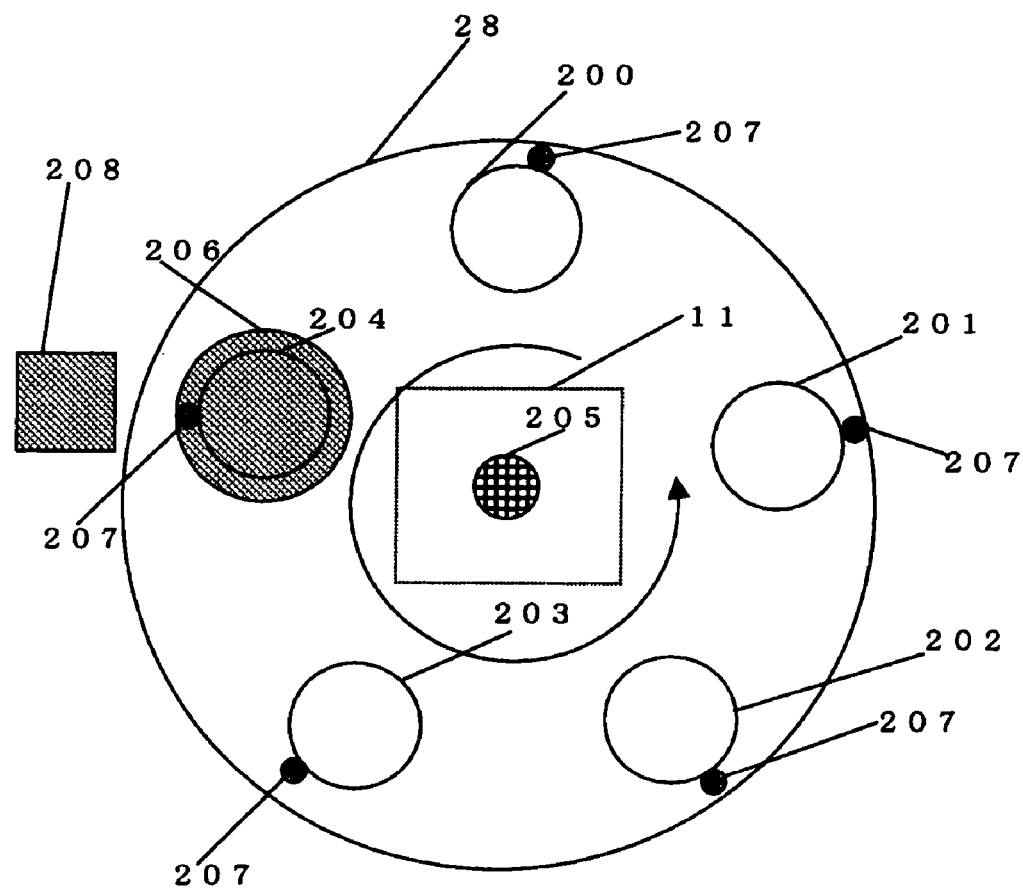
FIG. 2A is a diagram of the schematic configuration of the turret in FIG. 1, viewed from above.
Figure 2B:
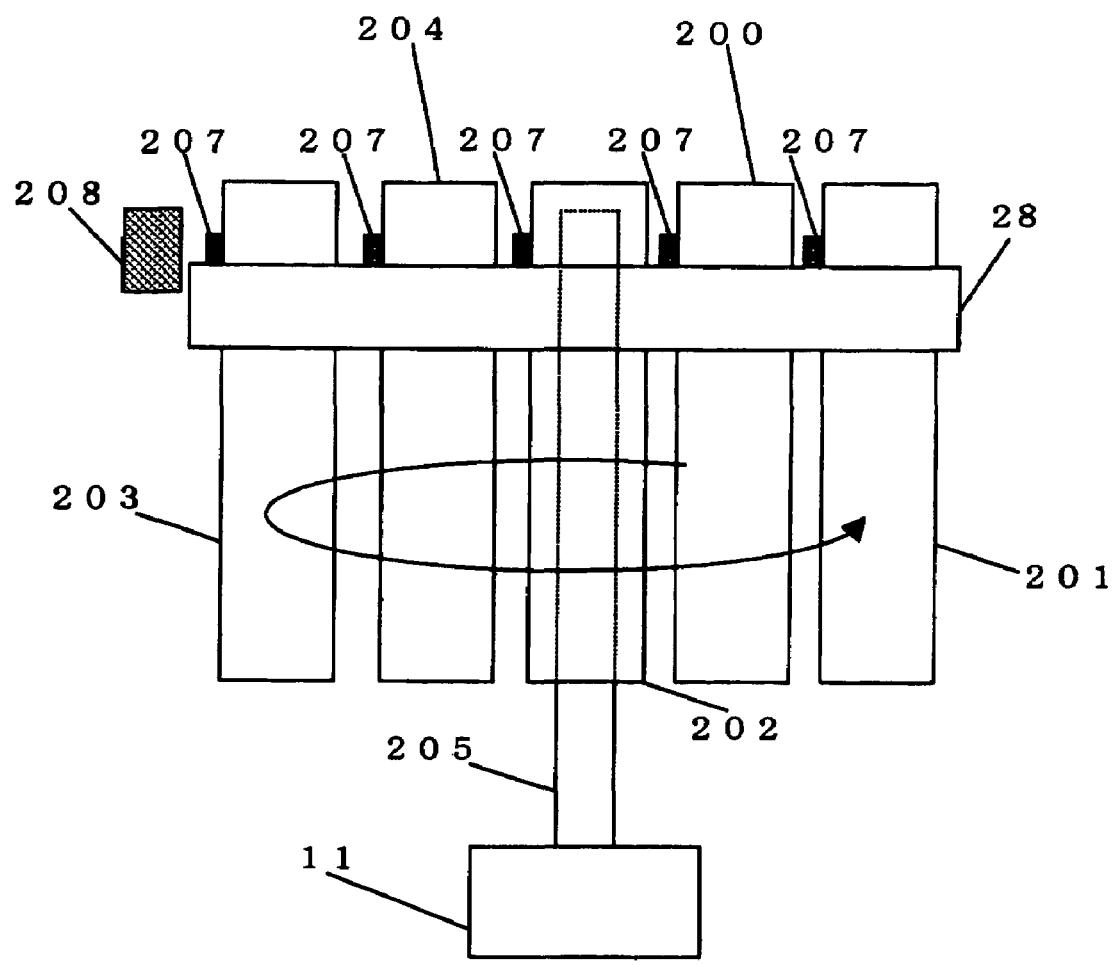
FIG. 2B is a diagram of the schematic configuration of the turret in FIG. 1, viewed from the side.

FIG. 2A and FIG. 2B show the schematic configuration of the turret 28. FIG. 2A is a diagram of the schematic configuration of the turret 28 viewed from above, and FIG. 2B is a diagram of the schematic configuration of the turret 28 viewed from the side.

The low-powered lens units 27a, b, c, and d, of which the observation power is a fixed-power, are set in attachment holes 200, 201, 201, and 203, respectively. The continuously variable zoom unit 26 is set in an attachment hole 204 (refer to FIG. 2A). Here, it is assumed the continuously variable zoom unit 26 is inserted into an observation light path 206.

When a motor within the turret electrical unit 11 (refer to FIG. 2B) rotates, the torque of the motor is transmitted to a turret axis 205. When the turret 28 rotates with this turret axis 205 as the center, one certain lens unit is inserted into the observation light path 206. A position sensor 207 is set in the attachment hole of each lens unit within the turret 28 and is configured to know immediately which lens unit is inserted into the observation light path 206 by a position sensor reading device 208. The position sensor 207 is composed of a magnet and the position sensor reading device 208 is composed of a magnetic sensor, such as a Hall IC. When the selected lens unit is inserted into the observation light path 206, the magnet is in close proximity to the magnetic sensor. The lens unit inserted into the observation light path 206 can be identified by the magnetic sensor reading the magnetism at this time.

The description of FIG. 1 is continued.

The turret electrical unit 11 is controlled by an electrical-control controller 5 which is connected via a cable 12. The cube 17 comprises a dichroic mirror switching mechanism, and with this mechanism, the dichroic mirror can be inserted into the observation light path through selection by a special-purpose software in a PC3.

The cube 17 is controlled by the electric-control controller 5 which is connected via a cable 18. A zoom mechanism motor (not shown) is installed within the continuously variable zoom mechanism 14, and low-powered to high-powered observations can be actualized by this continuously variable mechanism 14. This zoom mechanism motor is controlled by the electrical-control controller 5 which is connected via a cable 13.

A stage 25 is a platform for placing an observation subject. The stage 25 can be moved at the focusing speed by a Z stage electrical unit 9. The fluorescent light emitted from a specimen to which the excitation light is irradiated passes through a zoom mechanism objective lens 15, the continuously variable zoom mechanism 14, and the cube 17, and reaches a zoom mechanism imaging lens 19. Then, the fluorescent light passes through an absorption filter unit 21 and reaches a camera 23. The absorption filter unit 21 comprises an absorption filter switching mechanism, and the switching thereof is controlled by the electrical-control controller 5 which is connected via a cable 22. The camera 23 photographs an observation image of the sample and transmits the image data expressing the photographed image to the PC3 via a cable 24.

When low-powered lens units 27a, b, c, and d are inserted into the observation light path by operating the turret electrical unit 11, the excitation light which enters from the fiber 2 is irradiated onto the specimen by a commonly known deviated light, without passing the cube 17. The fluorescent returning light emitted from the specimen at this time is photographed by the camera 23 after passing through the absorption filter unit 21.

The electrical-control controller 5 is controlled by the PC 3 which is connected via a cable 6. The fluorescent light source device 1 is controlled by the PC 3 via a cable 4. The PC 3 controls the electrical-control controller 5 and the fluorescent light source device 1 by running a special-purpose software.

Figure 3:
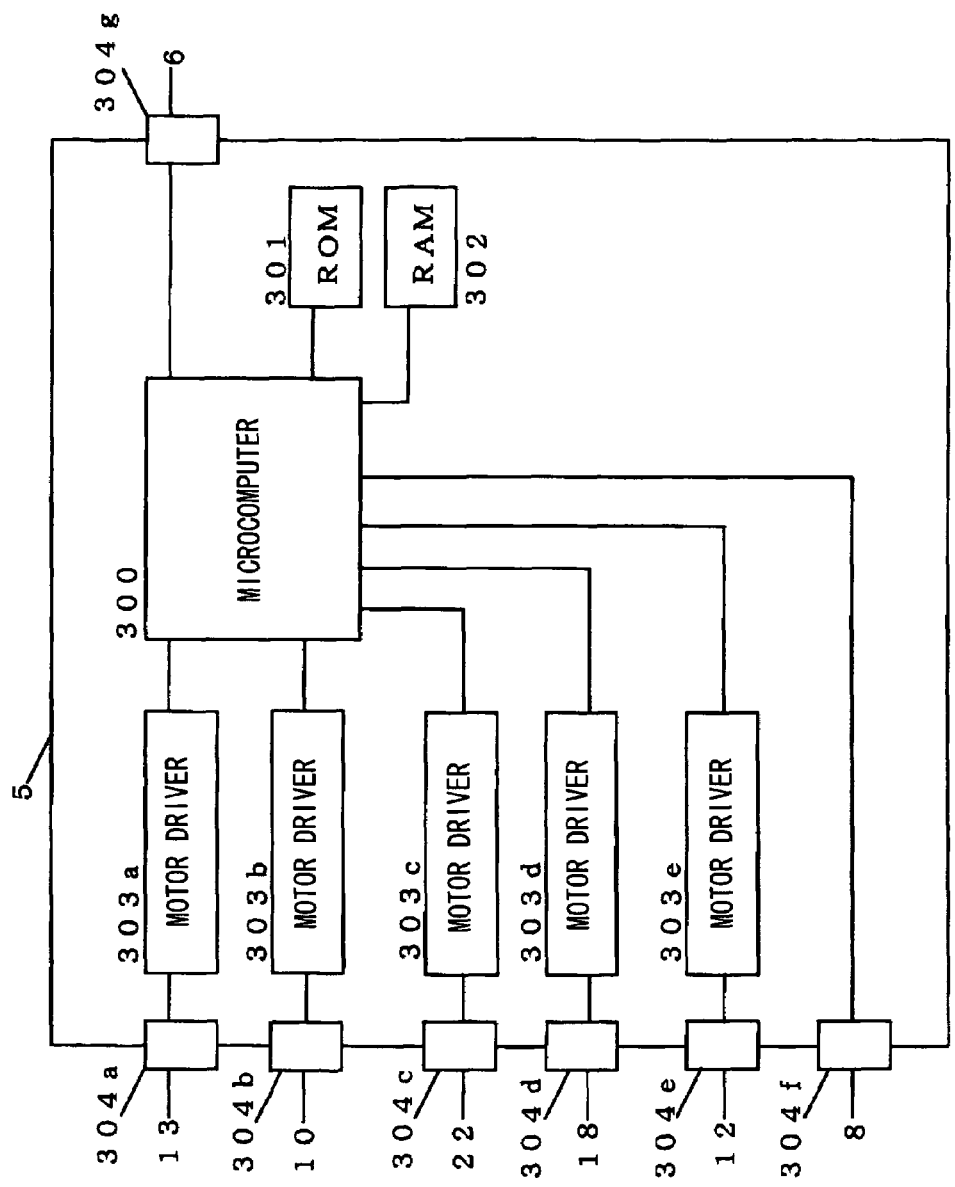
FIG. 3 is a diagram showing the schematic configuration of the electrical-control controller in FIG. 1.

FIG. 3 shows the overall configuration of the electrical-control controller 5.

The electrical-control controller 5 has a microcomputer 300. The microcomputer 300 governs the electrical control of the microscope device. A ROM 301 which is a recording medium to which a control program is stored in advance, a RAM 302 which holds the variable data of the control program, and external interface connectors 304f and 304g are connected to the microcomputer 300.

In addition, a motor driver 303a, a motor driver 303b, a motor driver 303c, a motor driver 303d, and a motor driver 303e are connected to the microcomputer 300. An external interface connector 304a, an external interface connector 304b, an external interface connector 304c, an external interface connector 304d, and an external interface connector 304e are connected to the motor driver 303a, the motor driver 303b, the motor driver 303c, the motor driver 303d, and the motor driver 303e, respectively.

The external interface connector 304a, the external interface connector 304b, the external interface connector 304c, the external interface connector 304d, and the external interface connector 304e are connected electrically to a cable 13, a cable 10, a cable 22, a cable 18, and a cable 12, respectively. Therefore, the microcomputer 300 drives the motors held respectively by the continuously variable zoom mechanism 14, the Z stage electrical unit 9, the absorption filter unit 21, the cube 17, and the turret electrical unit 11, via the motor driver 303a, the motor driver 303b, the motor driver 303c, the motor driver 303d, and the motor driver 303e, and therefore, to perform electrical control thereof.

In addition to being connected to the motor within the turret electrical unit 11, the cable 12 is connected to the position sensors 207 set in the attachment holes 200, 201, 202, 203, and 204 and the position sensor reading device 208, via the turret electrical unit 11. The positional information of the position sensor 207 is read by the position sensor reading device 208 and processed by the microcomputer 300, via the turret electrical unit 11 and the cable 12.

The microcomputer 300 monitors the current position of the continuously variable zoom mechanism 14 and the Z stage electrical unit 9 by storing the addresses indicating the respective motor rotation angles acquired from the motor driver 303a and the motor driver 303b.

The external interface connector 304f is connected to a bright-field light source 7 via a cable 8, and the microcomputer 300 can electrically control the bright-field light source 7.

The external interface connector 304g is connected to the PC3 via the cable 6. The respective electrical-control orders given by the PC3 are processed by the microcomputer 300.

Figure 4:
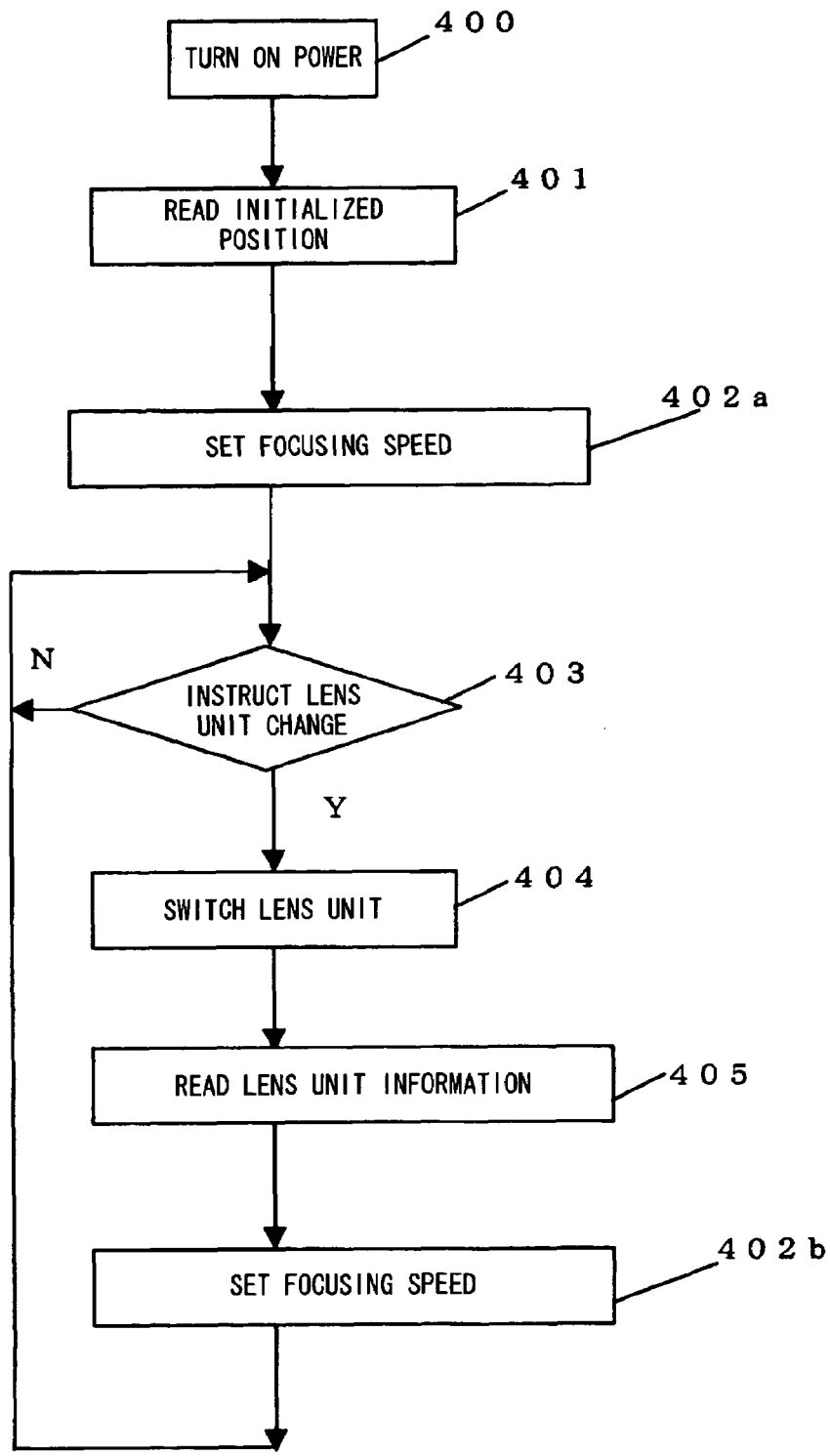
FIG. 4 is a flowchart showing a control operation in a first embodiment of the present invention.

Next, an operation of an embodiment configured as such is described in line with the flowchart in FIG. 4. Unless otherwise noted, the processing shown in FIG. 4 is performed by the microcomputer 300 which runs the control program stored in the ROM 301.

When the power is turned on in Step 400, in Step 401, a processing for having the position sensors 207 set in the attachment holes 200, 201, 202, 203, and 204 of each lens unit within the turret 28 detect which lens unit within the turret 28 is inserted into the observation light path 206 in an initial state and read the detection result is performed. When the processing for reading information of the lens unit inserted into the observation light path 206 is completed, a process for setting the focusing speed of the lens unit currently inserted into the observation light path 206 is performed in Step 402a. The setting of the focusing speed is performed by a special-purpose software in the PC3, via the microcomputer 300.

Next, in Step 403, a processing for acquiring an instruction to change the lens unit to be implemented for observation is performed. In this change instruction, an instruction which is the result of selection by the special-purpose program in the PC3 is given. At this time, the change instruction is not given when the designated lens unit is already inserted into the observation light path 206. Subsequently, in Step 404, a process for driving the motor within the turret electrical unit 11, rotating the turret 28 via the turret axis 205, and inserting the designated lens unit into the observation light path 206 is performed.

Next, in Step 405, a processing for reading the lens information of the lens unit designated in Step 403 is performed. Then, in Step 402b, a processing for setting the focusing speed corresponding to the designated lens unit is performed.

When the processes in Step 402b to Step 405, above, are completed, the process returns to Step 403 and enters a state awaiting the next lens unit change instruction.

Figure 5:
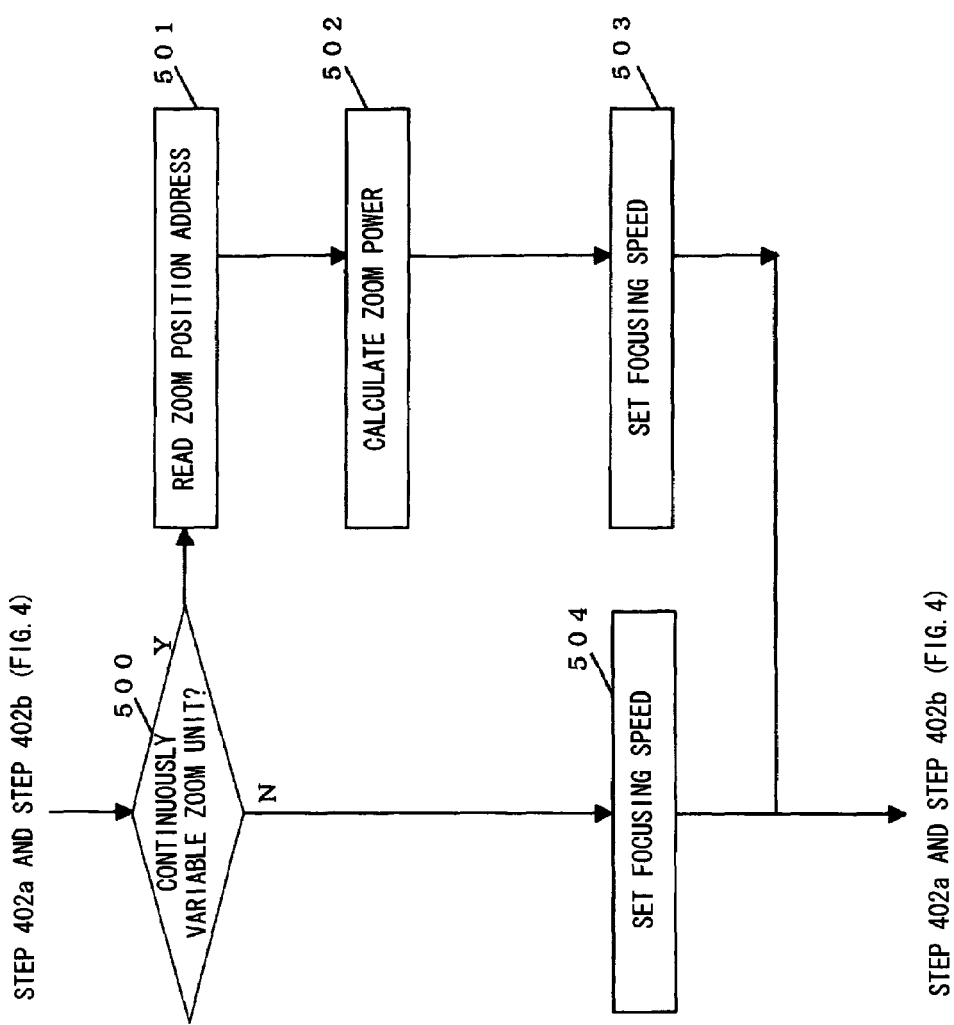
FIG. 5 is a flowchart showing the details of the control operation in the first embodiment of the present invention.

In FIG. 5, the details of the focusing speed setting processing in Step 402a and Step 402b in FIG. 4 are shown by a flowchart.

First, in Step 500, the microcomputer 300 performs a processing for determining whether or not the lens unit inserted into the observation light path 206 is a continuously variable zoom unit 26.

The lens information of the lens unit inserted into the attachment hole within the turret 28 in the present embodiment is shown in FIG. 6. In this diagram, because the continuously variable zoom unit 26 is inserted into the attachment hole 204, the judgment result of Step 500 is YES.

If the judgment result of Step 500 is YES, a processing for reading the current zoom position address is performed in Step 501. The zoom position address is an address indicating the rotation angle of the motor within the continuously variable zoom mechanism 14, and the current position of the continuously variable zoom mechanism 14 can be known through this address.

In Step 502, a processing for calculating the current magnifying power of the continuously variable zoom unit 26, based on the acquired zoom position address, is performed. In the present embodiment, the magnifying power of the continuously variable zoom unit 26 can be calculated by implementing the Equation (1), below:

$$\text{Zoom power} = \text{objective power} \times 10^{\{(-address+240)/300\}} \quad (1)$$

The zoom position address is managed by the microcomputer 300 using the RAM 302, and has a value in the range of 0 to 300. The objective power is the magnifying power of the zoom mechanism objective lens 15 which is combined in the continuously variable zoom unit 26 and is 2× herein.

In Step 503, a processing for setting the focusing speed is performed based on the zoom power determined in Step 502. The setting of the focusing power is performed with reference to a table such as that exemplified in FIG. 7. The setting parameters of the focusing speeds corresponding to each lens unit are set in this table. This table data is loaded into the special-purpose software of the PC3. The PC3 performs processing for setting the focusing speed acquired from this table to the motor driver 303b via the microcomputer 300, in accordance to the operator's instructions.

On the other hand, when the result of the judgment processing in Step 500 is NO, any one of the low-powered lens units 27a, b, c, and d is assumed to be inserted into the observation light path 206. In this case, the processing for setting the focusing speed is performed in Step 504. This focusing speed setting is also performed with reference to the table exemplified in FIG. 7.

Herein, the setting of the focusing speed according to the processing shown in FIG. 5 is described using an actual example. In this actual example, the lens unit inserted into the observation light path 206 is assumed to be the continuously variable zoom unit 26.

In this actual example, first, the result of the judgment processing in Step 500 of FIG. 5 is YES and the process proceeds to Step 501. In Step 501, the reading of the zoom position address is performed. Here, the read address is assumed to be "150".

Next, in Step 502, a zoom power calculation processing is performed. If the zoom position address is "150", the value of Equation (1) is 3.99. In other words, the zoom power is determined to be about 4×.

Next, in Step 503, the focusing speed setting processing is performed. Here, from FIG. 7,
Micromotion: 5000 (=8000/4$^2$) [µm/s]
Flutter: 37500 (=600000/4$^2$) [µm/s]

are set as the focusing speed of the continuously variable zoom unit 26. In this way, the setting of respective focusing speeds, when a micromotion operation is performed and when a flutter operation is performed, is completed.

The microscope device of the present embodiment which is configured and controlled as such comprises a plurality of low-powered lens units and a continuously variable zooming unit, and observation in a wide magnification range from low-magnification to high-magnification can be performed freely. In addition, changes to the observation power and the focusing speed which are electrically controlled are switched by software, rather than by the operator himself. Therefore, this microscope device is superior in operability.

The foregoing embodiment is merely an example and can have a configuration such as that below.

For example, although an instance wherein five lens units are mounted onto the turret 28 was described in the foregoing embodiment, the microscope device can be configured such that a desired number of low-powered lens units and continuously variable zoom units are mounted onto the turret 28.

In addition, in the foregoing embodiment, the shape of the turret 28 is circular and the switching of the lens unit is actualized by a rotation mechanism. Alternatively, the configuration of the lens unit switching can, for example, implement a belt conveyor method.

Figure 8B:
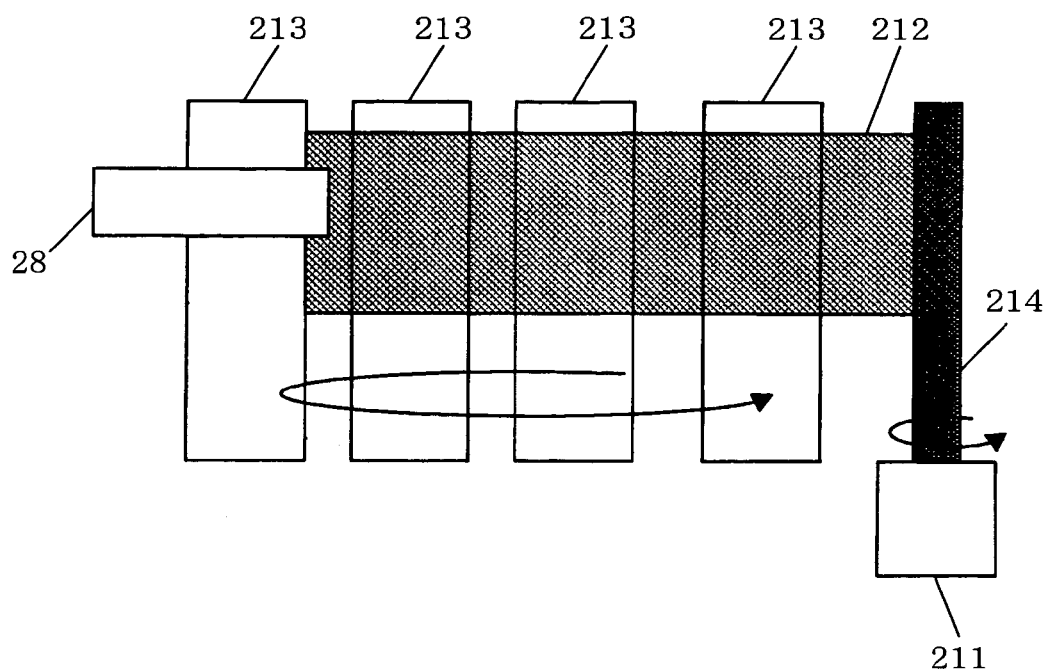
FIG. 8B is a diagram of the schematic configuration of the first modified example of the lens switching mechanism, viewed from the side.
Figure 9:
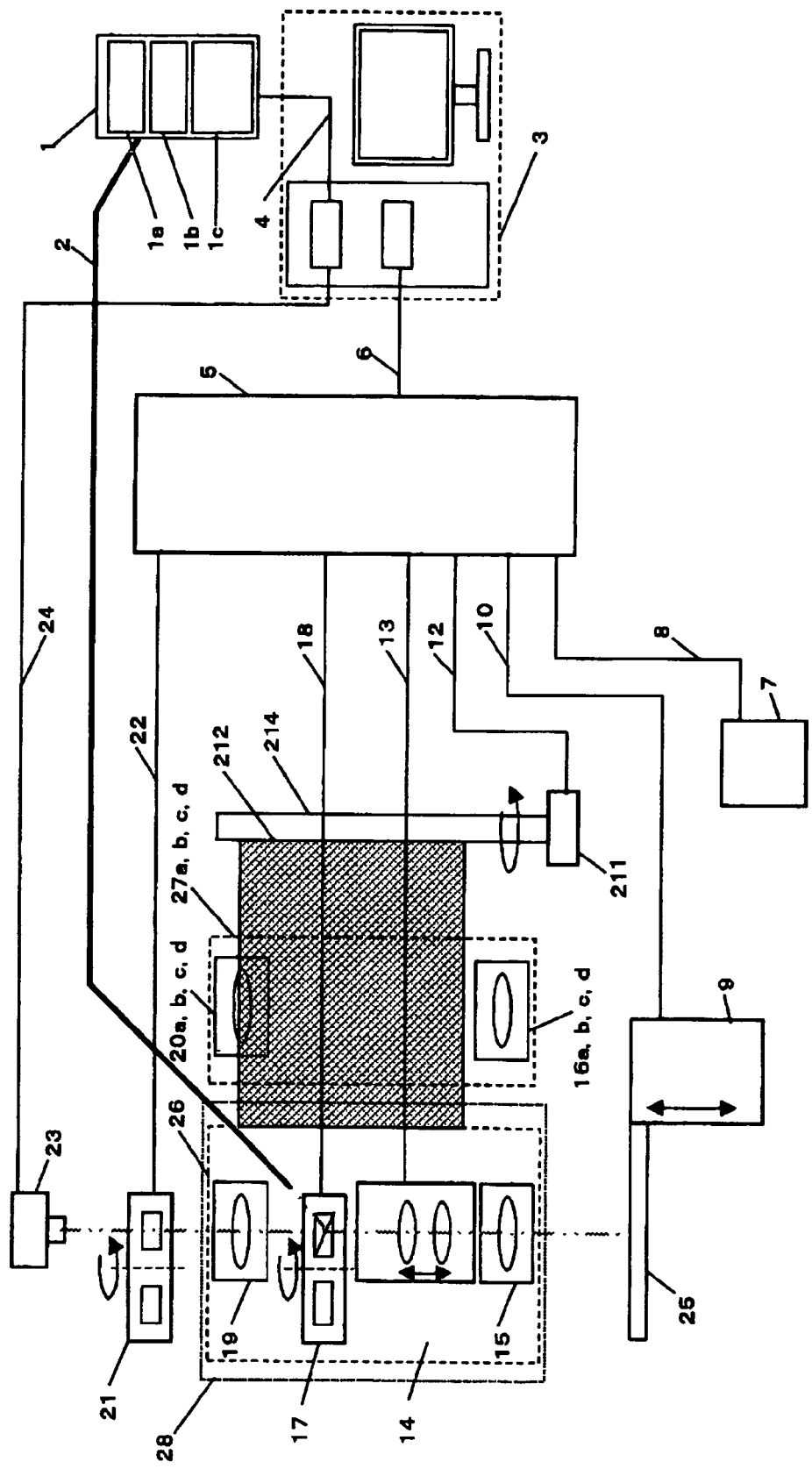
FIG. 9 is a diagram showing a first modified example of the first example of the schematic configuration of the microscope implementing the present invention.

FIG. 8A and FIG. 8B show the schematic configurations of this lens unit switching mechanism. FIG. 8A is a diagram of this schematic configuration viewed from above, and FIG. 8B is a diagram of this schematic configuration viewed from the side. In addition, the configuration of a microscope device comprising this switching mechanism is shown in FIG. 9.

Each lens unit 213 (low-powered lens unit 27a, b, a, and d, and continuously variable zoom lens unit 26) is connected to a belt conveyor 212. When a motor within the belt conveyor electrical unit 211 rotates, the torque of the motor is transmitted to a belt conveyor axis 214. When the belt conveyor axis 214 rotates in the direction of the arrow, the belt conveyor 212 is sent in the direction of the arrow, and each lens unit 213 is inserted into the observation light path 206, sequentially. The movement direction of the belt conveyor 212 (the rotation direction of the belt conveyor axis 214) can be the opposite of the direction of the arrow shown in FIG. 8A and FIG. 8B.

In addition, in place of a configuration wherein the lens unit inserted into the observation light path is switched as described above, the microscope device can be configured such that the turret onto which the lens unit is mounted is fixed and the observation light path is switched.

Figure 10B:
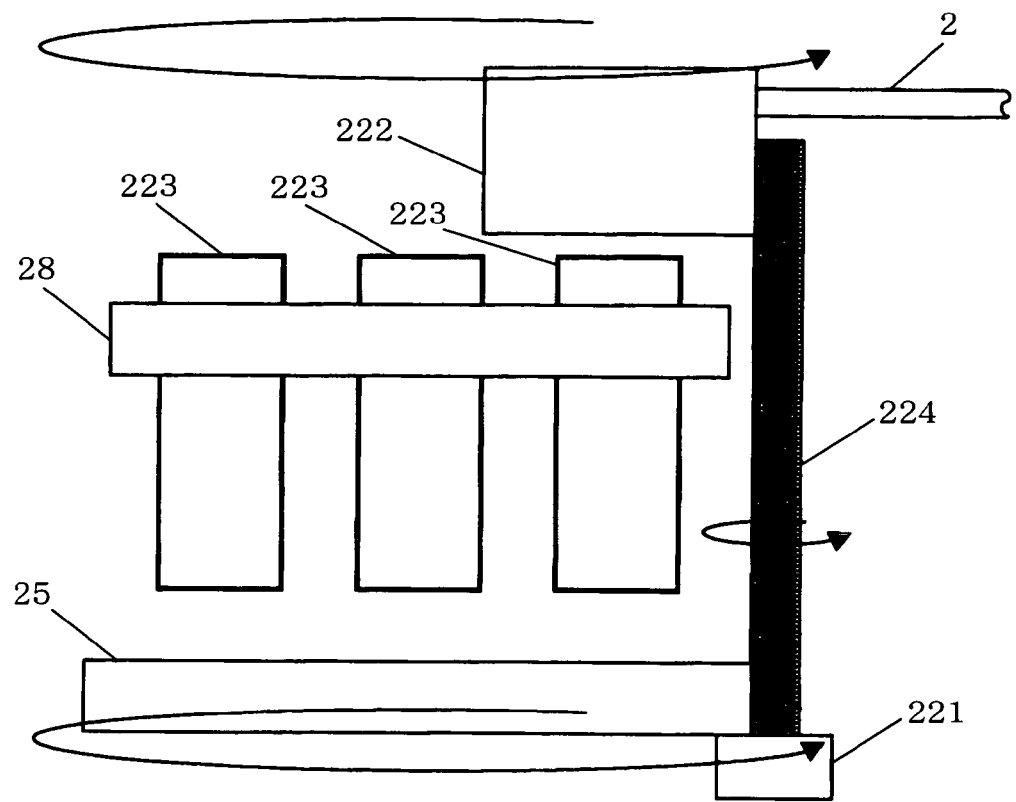
FIG. 10B is a diagram of the schematic configuration of the light path switching mechanism, viewed from the side.
Figure 11:
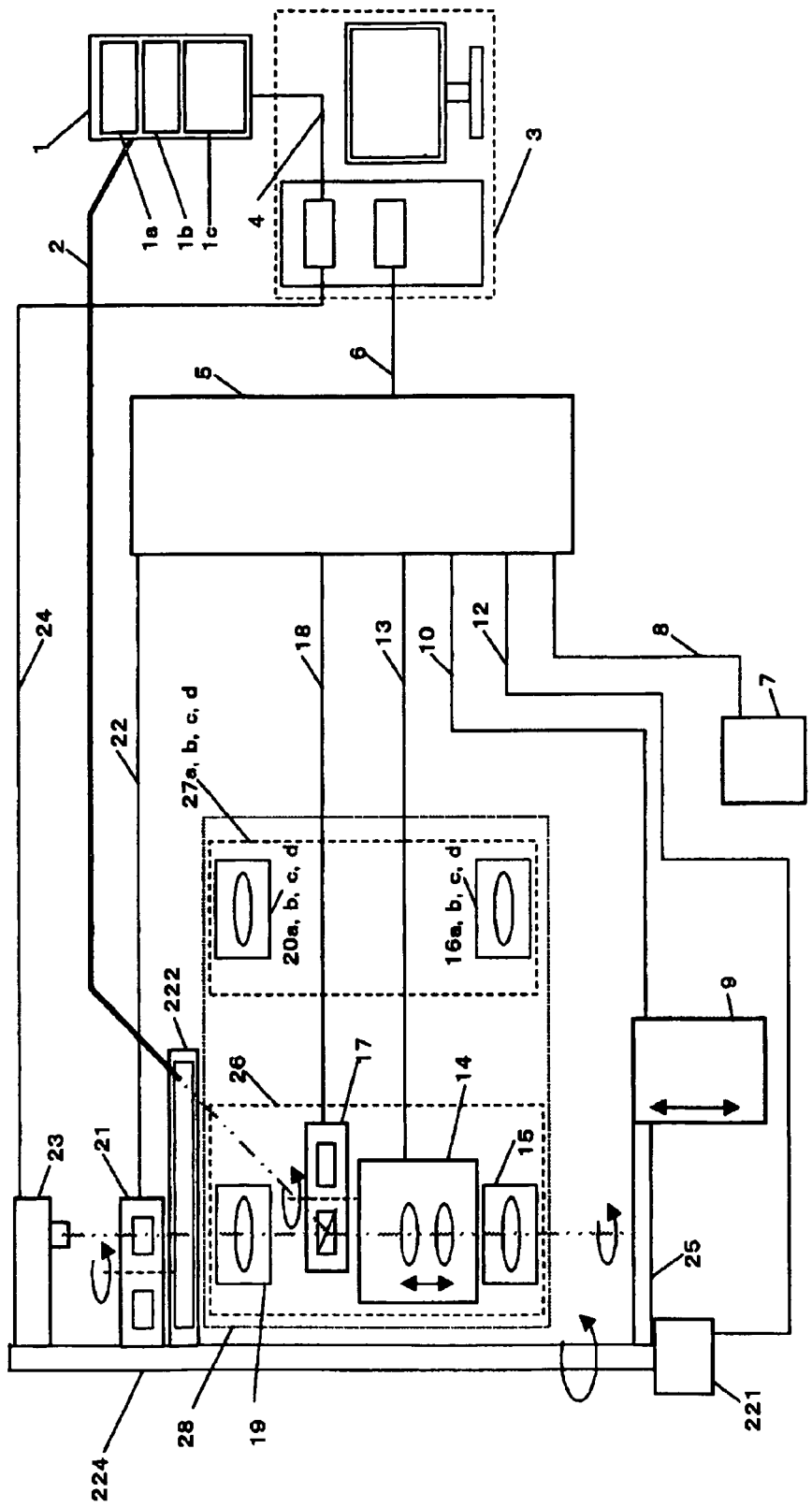
FIG. 11 is a diagram showing a second modified example of the first example of the schematic configuration of the microscope implementing the present invention.

FIG. 10A and FIG. 10B show the schematic configuration of an observation light path switching mechanism as such. FIG. 10A is a diagram showing this schematic configuration viewed from above, and FIG. 10B is a diagram of this schematic configuration viewed from the side. In addition, the configuration of a microscope device comprising this switching mechanism is shown in FIG. 11.

Each lens unit 223 (low-powered lens unit 27a. b. c, and d, and continuously variable zoom unit 26) is mounted onto the turret 28. When the motor within the observation light path electrical unit 221 rotates, the torque of the motor is transmitted to a light path axis 224. When the light path axis 224 rotates in the direction of the arrow, a light path insertion device 222, the stage 25, the absorption filter unit 21, and the camera 23 move around the turret 28, the observation light path moves, and each lens unit 213 is inserted into the observation light path sequentially.

In addition, in Step 401 in the flowchart shown in FIG. 4, the lens unit which is inserted into the observation light path 206 is identified by the position sensors 207 which are set in each attachment hole 200, 201, 202, 203, and 204 of the turret 28. Alternatively, the lens unit inserted into the observation light path can be identified based on the rotation amount of the turret 28, namely the rotation amount of the motor in the turret electrical unit 11.

In addition, the electrical-control controller 5 is connected to the PC3, via the cable 6. However, various standards, such as RS232C, USB, and IEEE1394, can be used as the data transmission standard by this cable, and in addition, the electrical-control controller 5 can be connected by LAN connection using Ethernet.

In addition, although the setting of the speed during micromotion and speed during flutter are performed as focusing speed setting, the focusing speed setting can be either one of these settings. In addition, the speed during ultra-micromotion which is lower than the speed during micromotion, the speed during mid-flutter which is higher than the speed during micromotion and lower than the speed during flutter, and the speed during ultra-flutter which is lower than the speed during flutter can be set.

Figure 12:
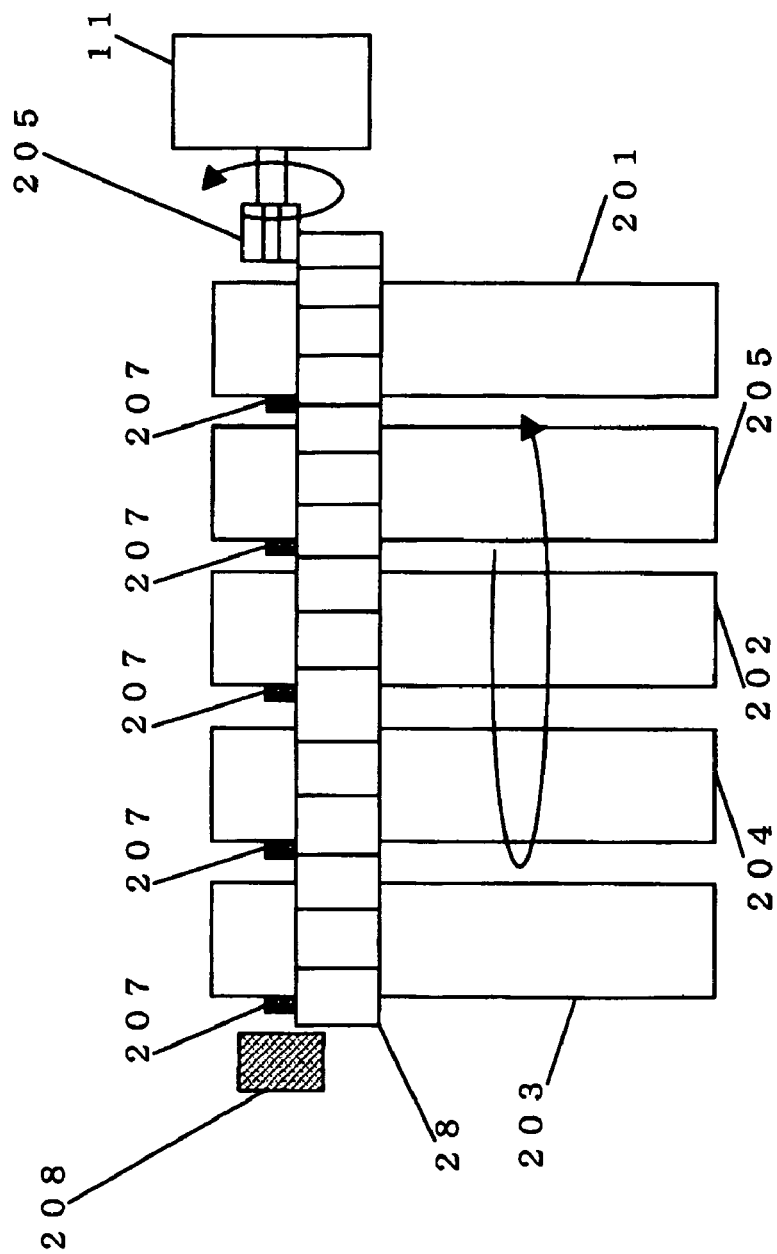
FIG. 12 is a diagram of the schematic configuration of a second modified example of the lens unit switching mechanism, viewed from the side.

In addition, although the turret electrical unit 11 in the diagram is set in the lower part of the turret 28 in the schematic configuration of the turret 28 shown in FIG. 2A and FIG. 2B, alternatively, the turret electrical unit 11 can be set on the side, as shown in FIG. 12. In the configuration shown in FIG. 12, the turret 28 is rotated when the turret axis 205 rotates, due to the meshing of the gears.

In addition, although the electrical-control controller 5 is wired with a separate cable for each driving unit, they can be wired collectively with one cable.

In addition, although the position sensor 207 and the position sensor reading device 208 are composed of a magnet and a Hall IC or the like, alternatively, lens unit detection can be performed using barcode.

Second Embodiment

Hereinafter, a second embodiment of the present invention is described with reference to the drawings.

A characteristic of the present embodiment is that the movement speed in the horizontal direction of the stage corresponds to the observation power of each lens unit. Therefore, the operator can perform stage operation at a constant speed without influence from the observation power.

Constituent elements in the second embodiment which are the same as those in the first embodiment are shown with the same reference number, and details descriptions thereof are omitted.

Figure 13:
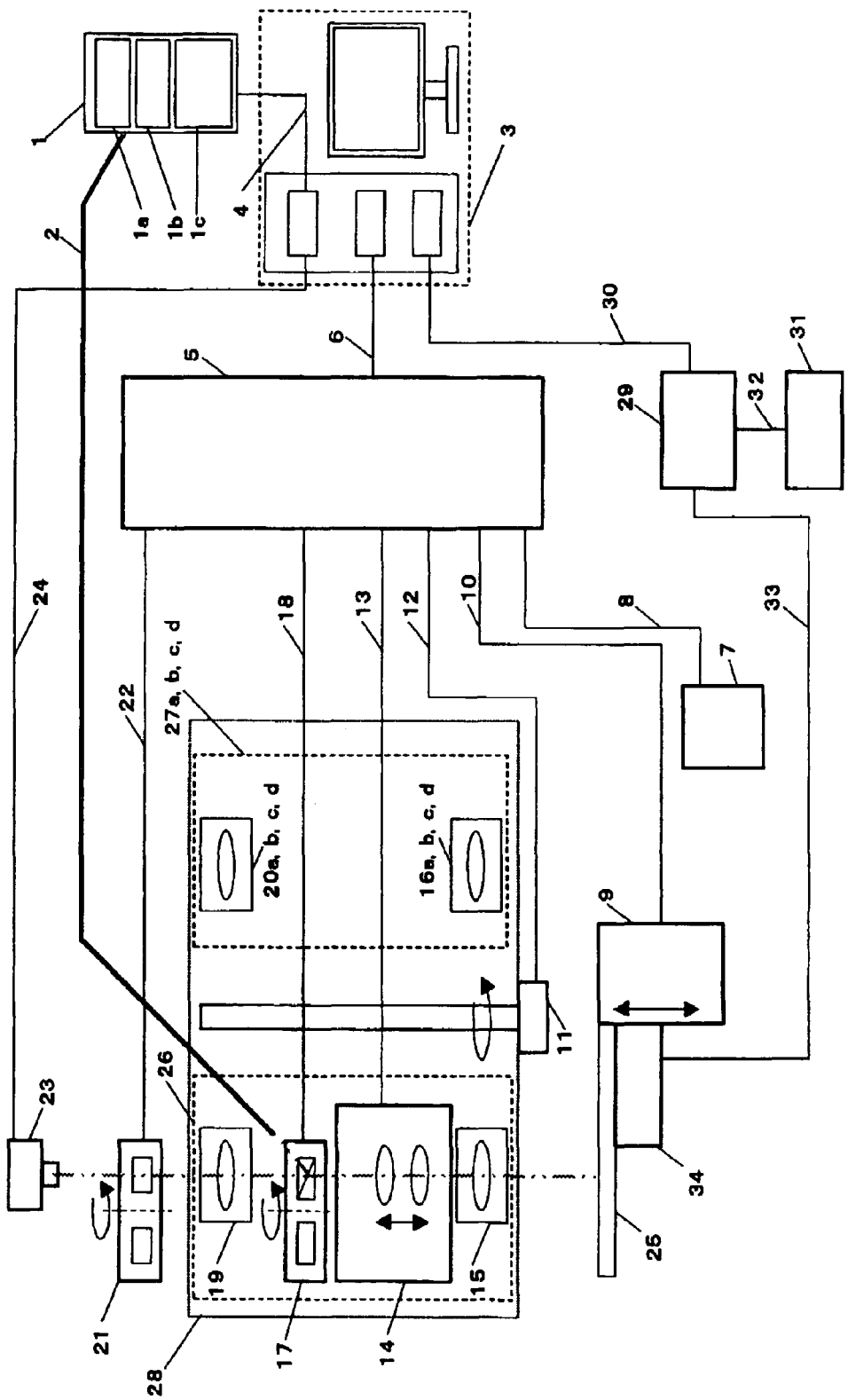
FIG. 13 is a diagram showing a second example of the schematic configuration of the microscope implementing the present invention.

FIG. 13 shows an overall configuration of the microscope device according to the present embodiment. In this configuration, an XY stage electrical unit 34 which can move within a plane vertical to the optical axis (referred to as an XY plane) is provided in the stage part of the first embodiment, to serve as an additional stage speed control. By implementing this XY stage electrical unit 34 and the Z stage electrical unit 9, the stage 25 can be electrically controlled arbitrarily within a three-dimensional space. The XY stage electrical unit 34 is controlled by an XY controller 29 which is connected via a cable 33. A joystick for manipulating XY and an XY operation input unit 31 to which a switch or the like which can perform a plurality of operations, such as input of an XY operation by a button or the switching between micromotion and flutter, is distributed are connected to the XY controller 29 via a cable 32. The XY controller 29 is connected to the PC3 via a cable 30.

Figure 14:
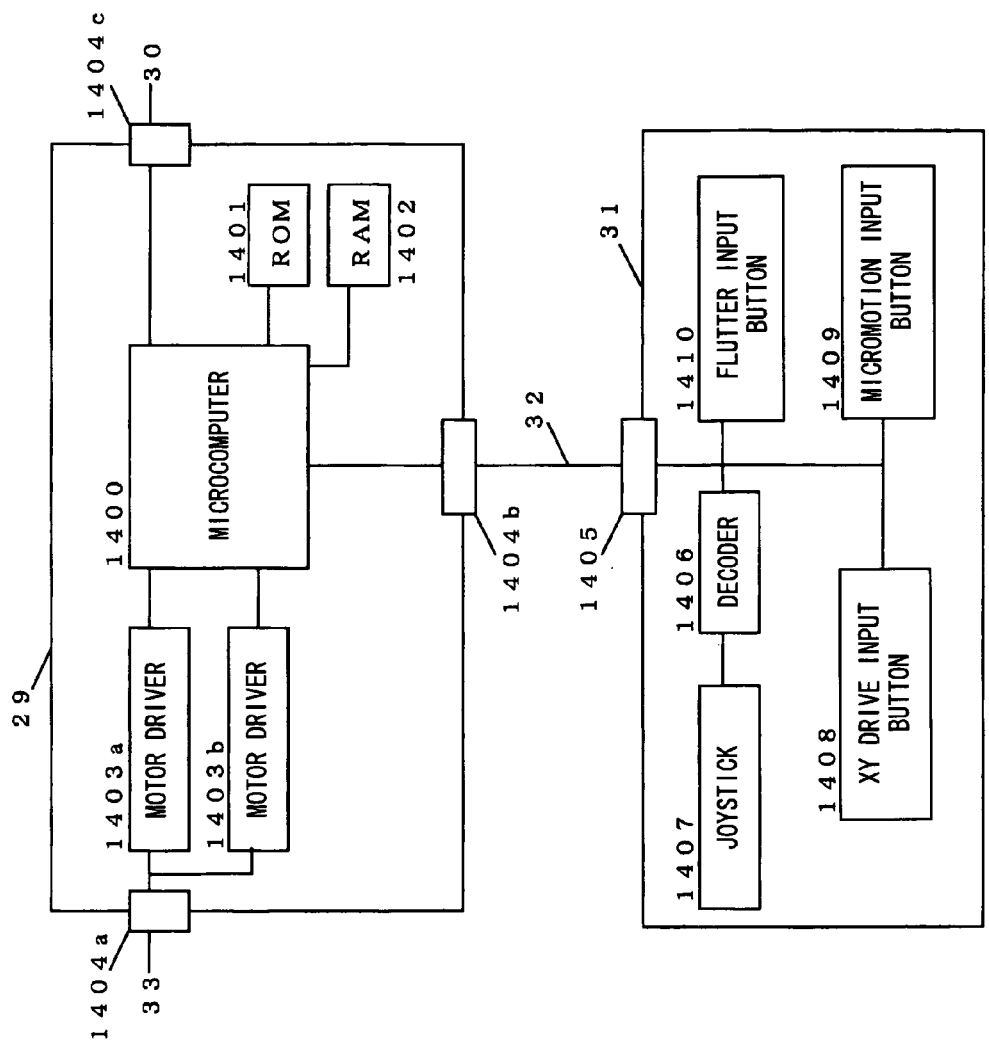
FIG. 14 is a diagram showing the schematic configuration of an XY controller and an XY operation input unit.

The schematic configuration of the XY controller 29 is shown in FIG. 14.

The XY controller 29 has a microcomputer 1400. The microcomputer 1400 governs the electrical control of XY. A ROM 1401 which is a recording medium to which a control program is stored in advance, a RAM 1402 which holds the variable data of the control program, and external interface connectors 1404b and 1404c are connected to the microcomputer 1400.

The external interface connector 1404b is connected to an external interface connector 1405 of the XY operation input unit 31 via a cable 32. The XY operation input unit 31 comprises a decoder 1406, a joystick 1407, an XY drive input button 1408, a micromotion input button 1409, and a flutter input button 1410. The microcomputer 1400 can detect joystick 1407 operation instructions and button operation instructions.

In addition, the microcomputer 1400 is connected to a motor driver 1403a and a motor driver 1403b. The motor driver 1403a and the motor driver 1403b are connected to an external interface connector 1404a. The external interface connector 1404a is electrically connected to a cable 33. Therefore, the microcomputer 1400 can control the XY movement of the stage 25 by driving the motor within the XY stage electrical unit 34 via the motor driver 1403a and the motor driver 1403b.

The microcomputer 1400 can monitor the current position (XY position) of the Stage 25, by storing the addresses indicating the respective motor rotation angles acquired from the motor driver 1403a and the motor driver 1403b in the RAM 1402.

The external interface connector 1404c is connected to the PC3 via the cable 30. The respective electrical control orders from the PC3 are processed by the microcomputer 1400.

Figure 15:
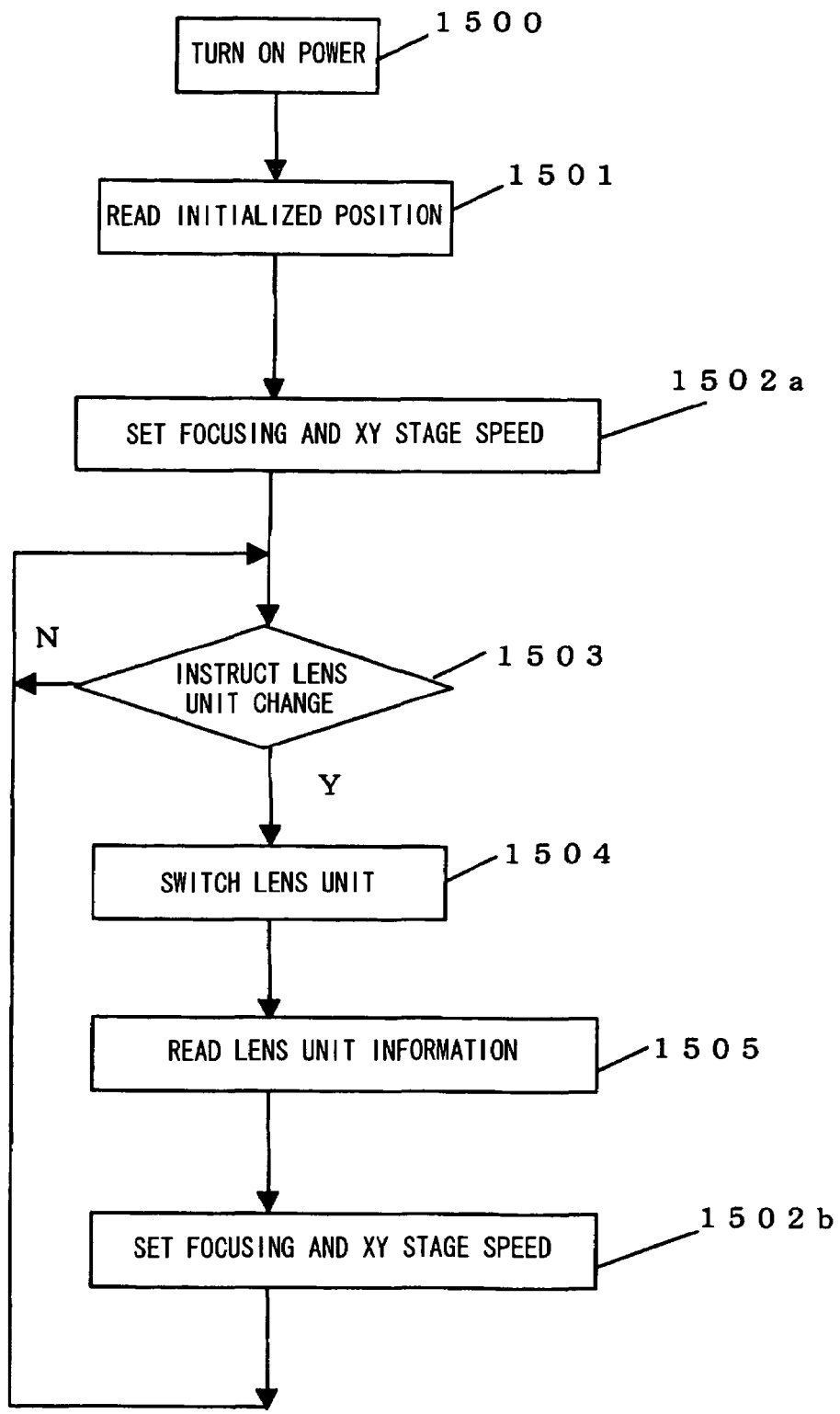
FIG. 15 is a flowchart showing a control operation in a second embodiment of the present invention.

Next, the operation of an embodiment configured as such is described in line with the flowchart in FIG. 15. Unless otherwise noted, the processing shown in FIG. 15 is performed by the microcomputer 300 or 1400 which runs the control program stored in the ROM 301 or 1401.

When the power is turned on in Step 1500, in Step 1501, a processing for having the sensors set in the attachment holes detect which lens unit within the turret 28 is inserted into the observation light path and read the detection result is performed. When the reading of the information on the lens unit inserted into the observation light path is completed, a process for setting the stage speed and the XY stage speed of the lens unit currently inserted into the observation light path is performed in Step 1502a.

Next, in Step 1503, a processing for acquiring an instruction to change the lens unit to be used for observation is performed. In this change instruction, the result selected by the special-purpose software in the PC3 is designated. Here, when an instruction to change the lens unit to be used for observation is received, a processing for rotating the motor within the turret electrical unit 11, rotating the turret 28 via the turret axis 205, and inserting the designated lens unit into the observation light path is performed in Step 1504.

Next, in Step 1505, a processing for reading the lens information of the lens unit according to the instruction acquired in Step 1503 is performed. Then, in Step 1502b, a processing for setting the focusing speed and the XY stage speed corresponding to the designated lens unit is performed. When the processing in Step 1502b is completed, the process returns to Step 1503 and enters a state awaiting the next lens unit change instruction.

Figure 16:
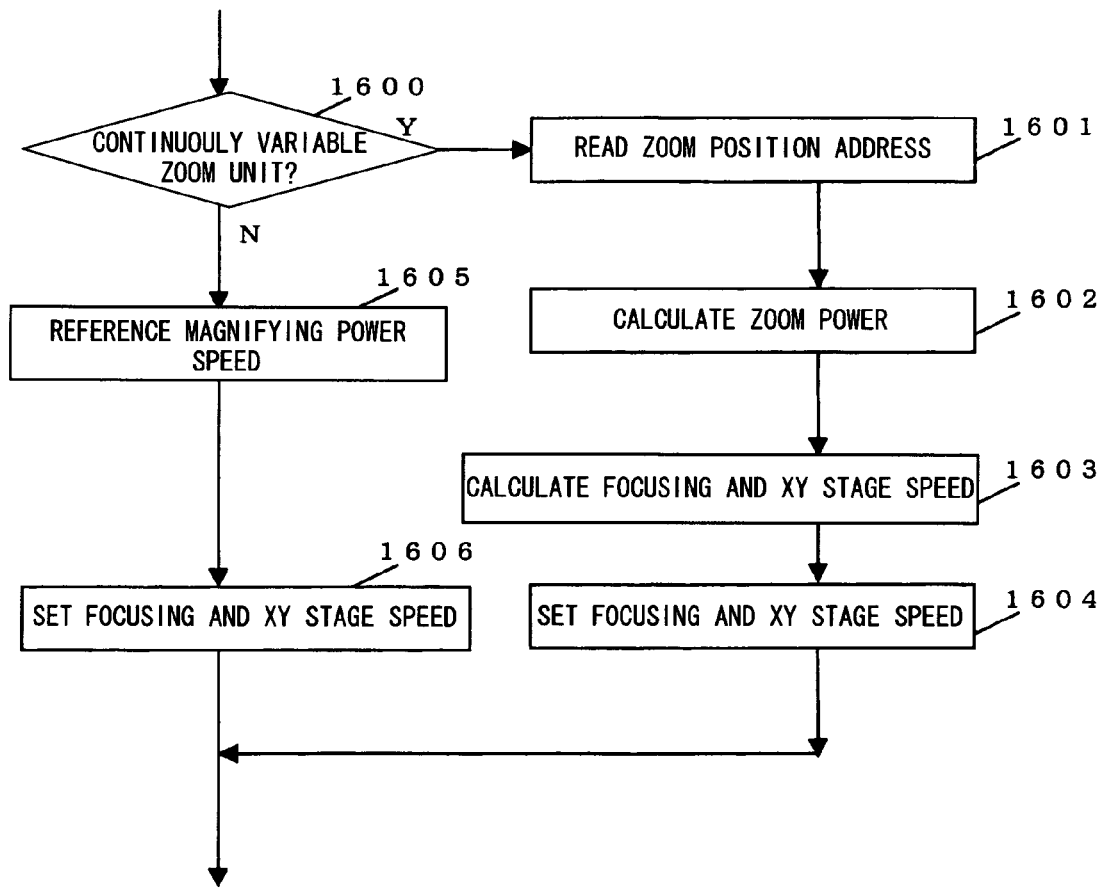
FIG. 16 is a flowchart showing the details of the control operation in the second embodiment of the present invention.

In FIG. 16, the details of the setting processing for the focusing speed and the XY stage speed in Step 1502a and Step 1502b are shown by a flowchart.

The lens information of the instructed lens is already read by the processing in Step 1501 or Step 1505 in FIG. 15. In Step 1600, a processing for determined whether or not the read lens unit is the continuously variable zoom unit 26 is performed.

The lens information of the lens units inserted into the attachment holes within the turret 28 in this embodiment are the same as that shown in the aforementioned FIG. 6. Therefore, if the attachment hole 204 is detected, this means the continuously variable zoom unit 26 is inserted into the observation light path, and the judgment result of Step 1600 is YES.

If the judgment result is YES in this judgment processing in Step 1600, a processing for reading the zoom position address is performed in Step 1601. The zoom position address is an address indicating the rotation angle of the motor within the continuously variable zoom mechanism 14, and through this, the current position of the current continuously variable zoom mechanism 14 can be known.

In Step 1602, a processing for calculating the current magnifying power of the continuously variable zoom unit 26 is performed based on the acquired zoom position address. Specifically, the current magnifying power of the continuously variable zoom unit can be calculated by implementing the abovementioned Equation (1).

In Step 1603, a processing for calculating the focusing speed and the XY stage speed based on the magnifying power calculated by the processing in Step 1602 is performed. The focusing speed and the XY speed are acquired with reference to a table such as that exemplified in FIG. 17. The setting parameters of the focusing speeds and XY stage speeds corresponding to each lens unit are set in this table. This table data loaded into the special-purpose software in the PC3. In Step 1604, the PC3 performs processing for setting the focusing speed and the XY stage speed acquired from this table to the motor drivers 1403a and 1403b via the microcomputer 1400, in accordance to the operator's instructions.

On the other hand, if the lens unit inserted into the observation light path is the low-powered lens unit 27a, b, c, or d, Step 1600 is NO and the processing proceeds to Step 1605. In Step 1605, the focusing speed and the XY stage speed corresponding to the magnifying power of each lens unit are referenced and acquired from the table exemplified in FIG. 17. Subsequently, in Step 1606, the PC3 performs a processing for setting the focusing speed and XY stage speed acquired from this table to the motor driver 1403a and 1403b via the microcomputer 1400.

When the foregoing processing in Step 1604 or Step 1606 is completed, the processing returns to Step 1502a or Step 1502b in FIG. 15.

Here, the setting of the focusing speed and the XY stage speed according to the processing shown in FIG. 15 is described using an actual example. In this actual example, the lens unit inserted into the observation light path is assumed to be the continuously variable zoom unit 26.

In this actual example, first, the judgment result of Step 1600 in FIG. 16 is YES, and the processing proceeds to Step 1601. In Step 1601, the zoom position address is read. Here, the read address is assumed to be "150".

Next, in Step 1602, a processing for calculating zoom power is performed. When the position address is "150", the value of Equation (1) is 3.99. In other words, the zoom power is determined to be about 4×.

Next, in Step 1603, the focusing speed and the XY stage speed are set. Here, from FIG. 17, Focusing speed micromotion: $5000(=8000/4^2)$ [μm/s]
Focusing speed flutter: $37500(=600000/4^2)$ [μm/s]
XY stage speed micromotion: $198(=-19\times4+274)$ [μm/s]
XY stage speed flutter: $5435(=-569\times4+7711)$ are set as the focusing speed and the XY stage speed of the continuously variable zoom unit 26. In this way, the setting of the respective focusing speeds and the XY stage speeds, when performing micromotion and when performing flutter, is completed.

The microscope device of the present embodiment which is configured and controlled as such comprises a plurality of low-powered lens units and a continuously variable zooming unit, and observation in a wide magnification range from low-magnification to high-magnification can be performed freely. In addition, because the focusing speed and the XY stage speed are calculated and set based on the observation power, there is little difference in a feeling of the stage operation speed due to observation power, and thus, the microscope device is all the more superior in operability.

The foregoing embodiment is merely an example and can have a configuration such as that below.

Although three devices, the fluorescent light source device 1, the electrical-control controller 5, and the XY controller 29, are provided as controllers in the present embodiment, they can be configured collectively as one large electrical-control controller.

In addition, although the XY controller 29 and the XY operation input unit 31 are configured separately, they can be configured collectively as one large XY controller.

In addition, the actual example is one example of the setting of the focusing speed and the XY stage speed corresponding to each lens unit, and the microscope device can be configured such that the setting of the focusing speed and the XY stage speed are changed manually via a software in the PC3.

In addition, although both motor driver 1403a and motor driver 1403b and the external interface connector 1404a are connected in the XY controller 29, the XY controller 29 can be configured such that the configuration for control in the X direction and the configuration for control in the Y direction are independent, two external interface connectors are provided, and the two motor drivers are connected to the two external interface connectors, respectively.

Third Embodiment

Hereinafter, a third embodiment of the present invention is described with reference to the drawings.

A characteristic of the present embodiment is that, when a partial area is selected for an observation image, a control for selecting and switching to a lens unit with a magnifying power appropriate for the observation of the image (partial image) included within this partial area is performed.

Constituent elements in the third embodiment which are the same as those in the first embodiment or the second embodiment are shown with the same reference number, and detailed descriptions thereof are omitted.

The overall configuration of the microscope device according to the present embodiment being used is the same as that in the first embodiment in FIG. 1.

Next, an operation of the microscope device according to the present embodiment is explained in line with the flowchart in FIG. 18. Unless otherwise noted, the processing shown in FIG. 18 is performed by the microcomputer 300 which runs the control program stored in the ROM 301.

In Step 2000, a processing for having the sensors set in the attachment holes detect which lens unit within the turret 28 is inserted into the observation light path and reading the detection result is performed. When the reading of the information on this lens unit is completed, a processing for calculating the range selectable as the observation area from within the sample images taken using the lens unit currently inserted into the observation light path is performed in Step 2001.

Figure 19:
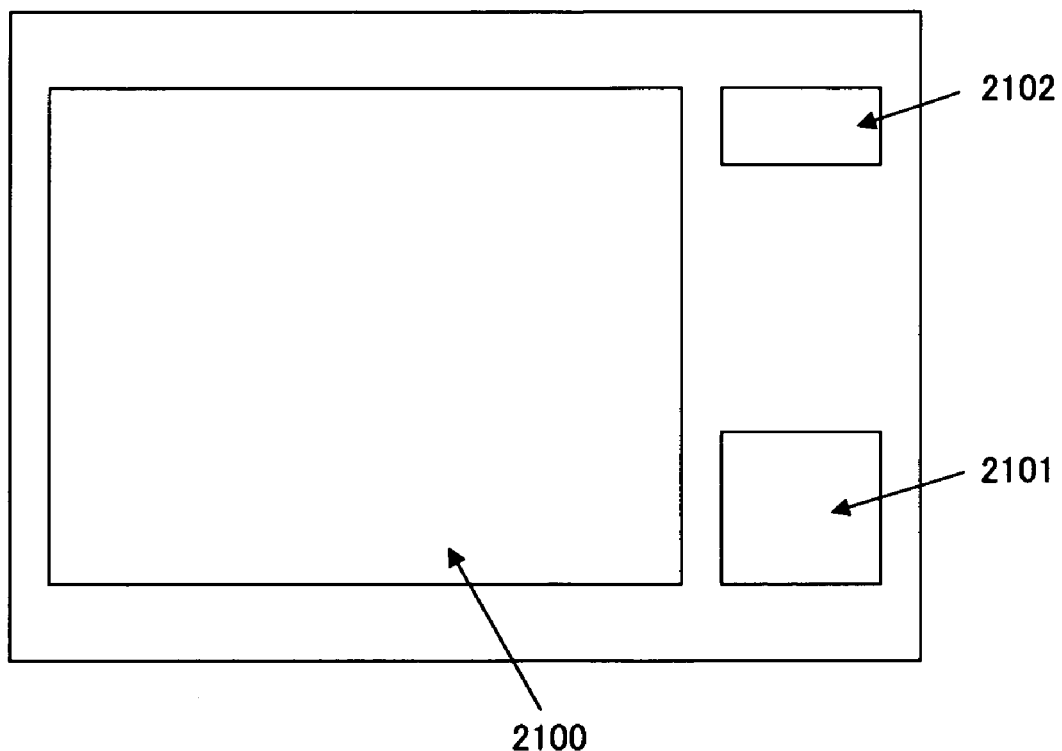
FIG. 19 is a diagram showing a display screen example of a sample image.

A display screen example of a display device of the PC3 is shown in FIG. 19. In this diagram, the sample image (video) is displayed in a live image display unit 2100. Here, when the user depresses an imaging set button 2101 by operating an input device, such as a mouse or a keyboard provided to the PC3, the image data expressing the still image of the sample at this time is stored to a memory device of the PC3.

In Step 2001, the range obtained by multiplying the magnifying power of the lens unit currently inserted into the observation light path with the observation view range when the magnifying power is 1× is calculated as the selectable range. However, in the present embodiment, the size of the live image display unit 2100 is 4080×3072 pixels. Therefore, this selectable range is a range which does not exceed this live image display unit 2100.

In Step 2002, a processing for acquiring an observation region selection result is performed.

When the user operates the input device of the PC3 and depresses an observation range selection set button 2102 over a rectangle drawn on the live image display unit 2100, the range of this rectangle is acquired as the selection result of the observation range. However, if the selected observation range is out of the observable range acquired by the processing in Step 2002, the observation range selection result is not acquired.

In Step 2003, a processing for determining whether the lens unit used for the observation of the image in the selected observation range is a fixed-power lens units 27a, b, c, or d, or the continuously variable zoom unit 26 is performed.

Each diagram from FIG. 20A to FIG. 20E is described. The tables shown in these drawings are examples of a table used to decide the lens unit to be used in the observation of an image in the selected observation range. Here, FIG. 20A is a table used when the lens unit currently inserted into the observation light path has a fixed-power of 1×; FIG. 20B is a table used when the lens unit currently inserted into the observation light path has a fixed-power of 2×; FIG. 20C is a table used when the lens unit currently inserted into the observation light path has a fixed-power of 3×; and FIG. 20D is a table used when the lens unit currently inserted into the observation light path has a fixed-power of 4×. In addition, FIG. 20E is a table used when the lens unit currently inserted into the observation light path is the continuously variable zoom unit 26

These table data are loaded into the special-purpose software in the PC3.

Figure 21:
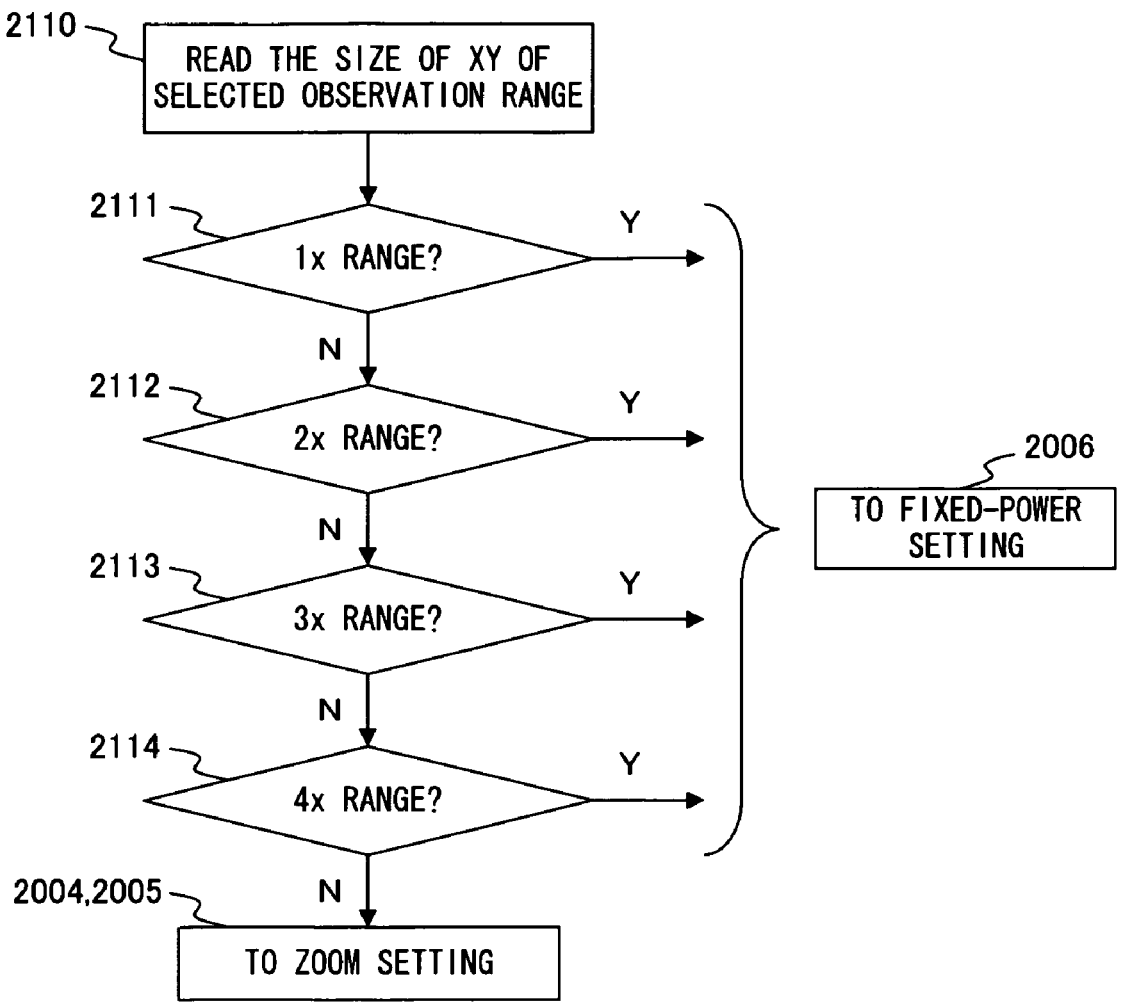
FIG. 21 is a flowchart showing the details of a control operation in a third embodiment of the present invention.

The lens unit to be used when observing the image in the selected observation range is decided according to the processing shown in the flowchart in FIG. 21.

In FIG. 21, first, a processing for acquiring the size of the selected observation area (size of the rectangle) is performed in Step 2110. Then, by the processing in the subsequent Step 2111 to Step 2114, a processing for deciding the lens unit to be used to acquire a sample image of the selected observation range, based on the tables respectively shown in FIG. 20A to 20E and from the lens unit currently inserted into the observation light path and the size of the selected observation range, is performed.

For example, if the lens unit currently inserted into the observation light path has a fixed power of 1×, the table in FIG. 20A is referenced. Here, if the selected observation range is X=1180 pixels and Y=896 pixels, this observation range falls under the range shown in the third row of the table in FIG. 20A. In this case, it is determined that the lens unit having a fixed power of 3×, shown in the first column of this row, is the most appropriate for subsequent observations. In other words, the judgment result of Step 2113, among the processing in Step 2111 to Step 2114, is YES and the process proceeds to Step 2006.

The description of FIG. 18 is continued.

When it is determined that the continuously variable zoom unit 26 is the lens unit deemed to be most appropriate as a result of the judgment processing in Step 2003, the processing proceeds to Step 2004 and a processing for rotating the motor within the turret electrical unit 11, rotating the turret 28 via the turret axis 205, and inserting this lens unit into the observation light path is performed. Then, in the subsequent Step 2005, the zoom power is changed by controlling the continuously variable mechanism 14 and becomes the magnifying power at which the partial image within the selected observation range is displayed the largest in the live image display unit 2100.

On the other hand, if it is determined that the low-powered lens units 27a, b, c, or d, which have fixed power, is the lens unit deemed to be most appropriate as a result of the judgment processing in Step 2003, the process proceeds to Step 2006, and a processing for rotating the motor within the turret electrical unit 11, rotating the turret 28 via the turret axis 205, and inserting this lens unit into the observation light path is performed.

The microscope device of the present embodiment which is configured and controlled as such comprise a plurality of low-powered lens units and a continuously variable zoom unit, and control for selecting and switching to a lens unit with magnifying power appropriate for the observation of the image (partial image) included in the partial area, when a partial area is selected for the observation image, is performed automatically.

The foregoing description is merely an example and can have a configuration such as that below.

In the present embodiment, the segmentation of the range of corresponding magnifying power (magnifying power at which the image within the selected observation area is displayed the largest on the live image display unit 2100), which serves as the basis for lens unit setting, is the same as the magnifying power of each lens unit, in the tables shown in FIG. 20A to FIG. 20E. Alternatively, for example, segmentation can be made such that the magnifying power of each lens unit is the center value of the corresponding magnifying power range, as exemplified in FIG. 22. In addition, this segmentation of the corresponding magnifying power range can be set as desired by the operator.

In addition, when setting the corresponding magnifying power range to overlap between each lens unit and performing image display at this overlapping magnifying power, the operator can select the lens unit to be used, as desired.

Figure 23:
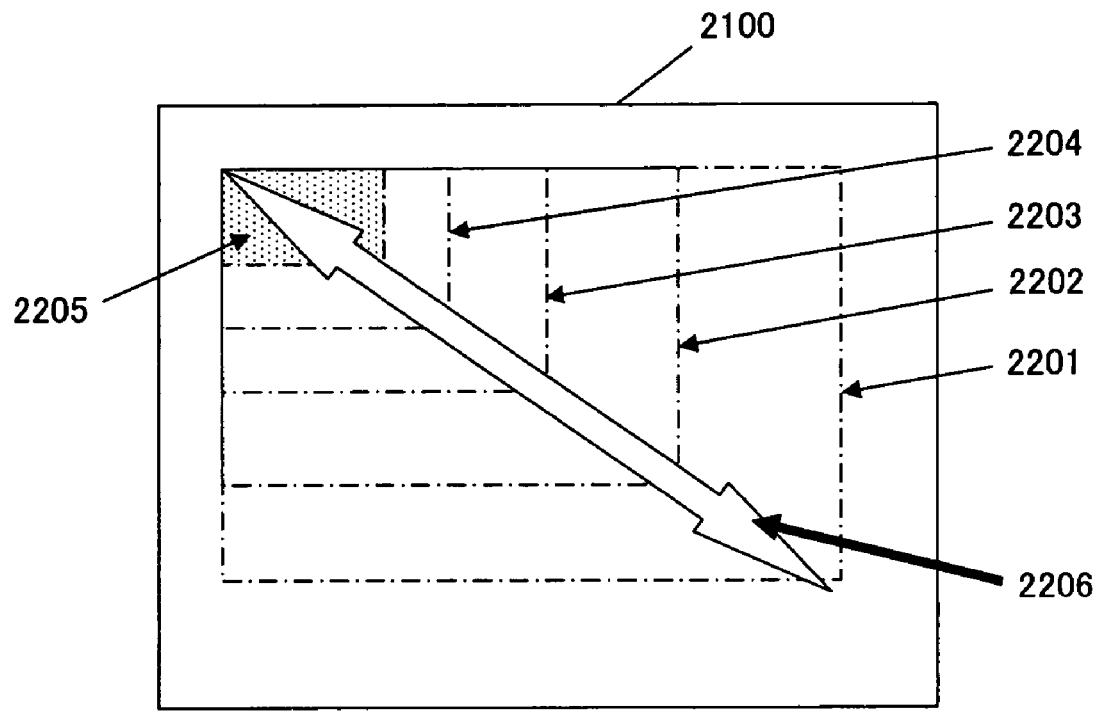
FIG. 23 is a diagram showing an example of a method for selecting an observation area on a live image display unit.

In addition, with regards to the observation range selection result acquisition processing on the live image display unit 2100, a selection made by the user from the observation range for each lens unit can be acquired as the selection result, as shown in FIG. 23.

In the live image display unit 2100 shown in FIG. 23, 1× lens unit observation range 2201, 2× lens unit observation range 2202, 3× lens unit observation range 2203, 4× lens unit observation range 2204, and 5× lens unit observation range 2205 are displayed, and furthermore, an arrow 2206 of which the length changes according to the manipulation of the input device by the operator is displayed. The lines indicating the borders of these observation areas do not have to be displayed.

When the operator operates the input device, the tip of the arrow 2206, which extends and contracts on the diagonal line of these observation ranges, discretely moves among the respective apexes of the 1× lens unit observation range 2201, the 2× lens unit observation range 2202, the 3× lens unit observation range 2203, the 4× lens unit observation range 2204, and the 5× lens unit observation range 2205. However, the tip moves continuously within the continuously variable zoom unit observation range 2205. When the operator operates the input device and depresses the observation range selection set button 2102 when the tip of the arrow 2206 is positioned on the apex of the desired observation range, this rectangular range is acquired as the observation range selection result. The microscope device can be configured to acquire the observation range selection results in this method.

In addition, the first embodiment and the second embodiment can be combined with the present embodiment, the movement speed of the stage 25 in the Z direction or the XY direction can be controlled based on the observation power, and the difference in operation derived from the difference in observation power can be absorbed, after the lens unit is switched.

Fourth Embodiment

Hereinafter, a fourth embodiment of the present invention is described with reference to the drawings.

Characteristics of the present embodiment are that the stage is lowered to the lowest position and moved in a horizontal direction in order to facilitate operations, such as sample exchange, when the sample housing chamber is opened during observation, and subsequently, when the sample housing chamber is closed, an automatic focusing operation control is performed using the lowest-powered lens unit to enable the subsequent observation to be started quickly.

Constituent elements in the fourth embodiment which are the same as those in the first embodiment, the second embodiment, or the third embodiment are shown with the same reference numbers, and detailed descriptions thereof are omitted.

The overall configuration of the microscope device according to the present embodiment being used is the same as that in the second embodiment in FIG. 13. However, a sample housing chamber 3000, such as that shown in FIG. 24, is provided in the stage 25 part in the present embodiment.

As shown in FIG. 24, the sample housing chamber is provided with a door 3001. When this door 3001 is closed, the interior of the sample housing chamber 3000 is blocked from external light and remains air-tight.

A door detection mechanism 3002 is a sensor for detecting the opened-state and the closed-state of the sample housing chamber 3000 by the open/close state of the door 3001. The output of this door detection mechanism 3002 is sent to the electrical-control controller 5 via a cable (not shown) and read by the microcomputer 300.

As described earlier, the stage 25 moves in the Z direction (direction of arrow 3003), when the motor of the Z stage electrical unit 9 is driven. In addition, the stage 25 moves within the XY plane when the motor within the XY stage electrical unit 34 is driven. Therefore, when the door 3001 is in an opened state, the stage 25 can be taken outside of the sample housing chamber 3000 (direction of the door 3001 opening).

Figure 25:
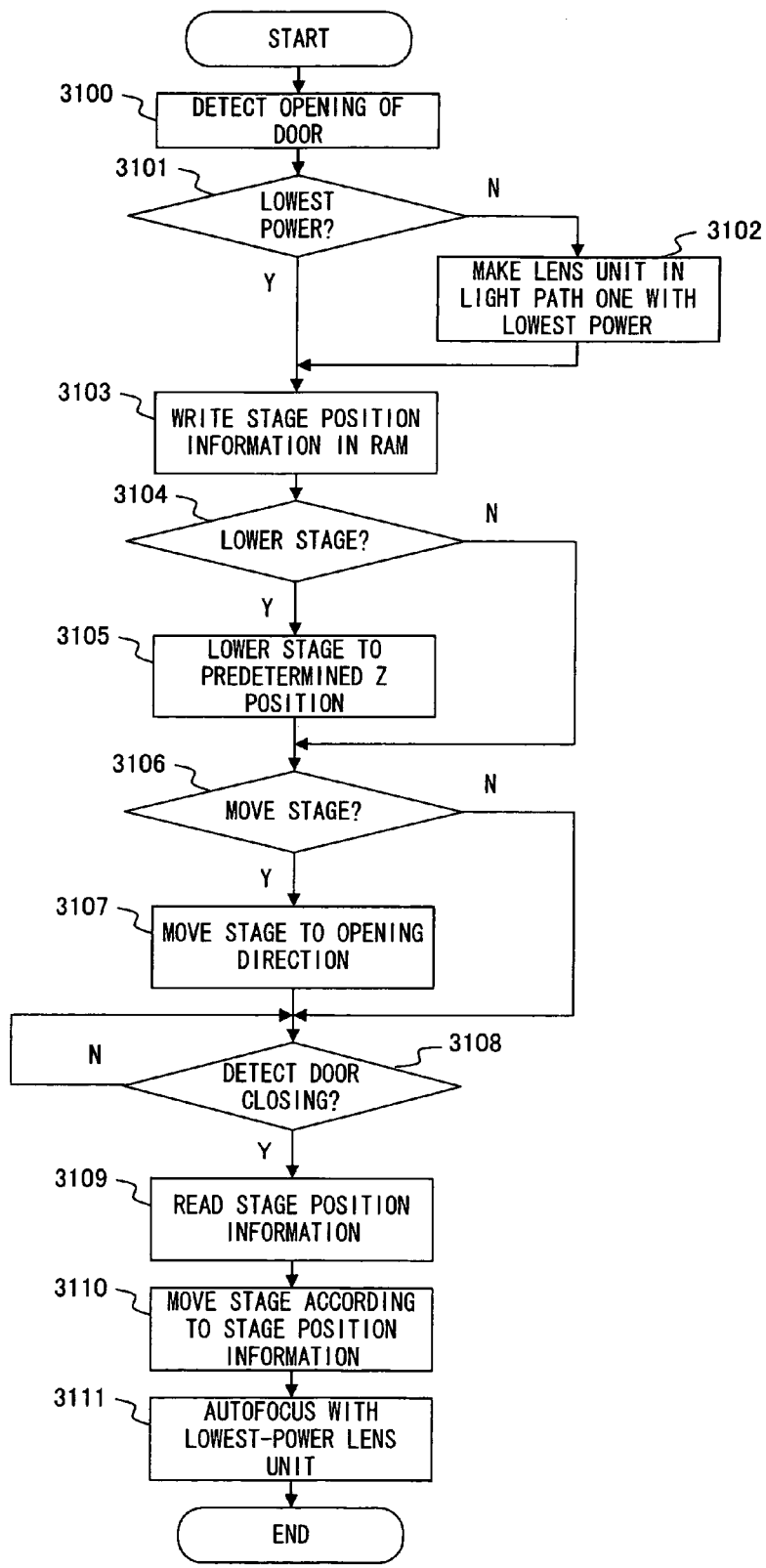
FIG. 25 is a flowchart showing a control operation in a fourth embodiment of the present invention.

Next, an operation of the microscope device according to the present embodiment is described in line with the flowchart in FIG. 25. Unless otherwise noted, the processing shown in FIG. 25 is performed by the microcomputer 300 or 1400 which runs the control program stored in the ROM 301 or 1401.

First, a processing for detecting the opening of the door 3001 by the door detection mechanism 3002 is performed in Step 3100.

When the opening of the door 3001 is detected, in Step 3101, a processing for reading the information of the lens unit inserted into the observation light path is performed, and a processing for determining whether this lens unit is the lowest-powered, fixed-power lens unit among the lens units mounted onto the turret 28 is performed. Here, if the judgment result is NO, a process for rotating the turret 28 by rotating the motor within the turret electrical unit 11 and inserting the lowest-powered, fixed-power lens unit into the observation light path is performed in Step 3102.

In Step 3103, a processing for acquiring the current positional information of the stage 25 from the XY stage electrical unit 34 and the Z stage electrical unit 9, and writing and holding this stage position information in the RAM 302 and 1402 is performed.

In Step 3104, a processing for determining whether the PC3 is configured in advance to lower the stage 25 in the Z direction (optical axis direction) when the door 3001 is opened is performed. Here, if the judgment result is YES, a processing for driving the motor within the Z stage electrical unit 9 and moving the stage 25 in the predetermined position (for example, a lowest position) is performed in Step 3105.

In Step 3106, a processing for determining whether the PC3 is configured in advance to take the stage 25 outside of the sample housing chamber 3000 (direction of the door 3001 opening) when the door 3001 is opened is performed. Here, if the judgment result is YES, a processing for driving the motor within the XY stage electrical unit 34 and moving the stage 25 in the direction of the door 3001 opening is performed in Step 3107.

Then, in Step 3108, a processing for detecting the closing of the door 3001 by the door detection mechanism 3002 is performed. Here, if the closing of the door 3001 is detected, the result of the judgment processing in Step 3108 becomes YES and the process proceeds to Step 3109.

In Step 3109, a processing for reading the stage position information held in the RAM 302 and 1402 is performed. In the subsequent Step 3110, a processing for driving the respective motors within the XY stage electrical unit 34 and within the Z stage electrical unit 9 and moving the stage 25 to a position indicated by the stage position information is performed.

In Step 3111, the PC3 executes an auto-focus control processing for moving the stage 25 such that the image of the sample acquired by the camera 23 is in focus, in the current state wherein the lowest-powered, fixed-power lens unit is inserted into the observation light path.

The microscope device of the present embodiment which is configured and controlled as such comprises a plurality of low-powered lens units and a continuously variable zoom unit. When the sample housing chamber is opened, the stage is lowered and moved in a horizontal direction according to the setting, and when the housing chamber is subsequently closed, an automatic focusing operation control implementing the lowest-powered lens unit is performed. Therefore, in this microscope device, the exchange of samples and the like are facilitated, and in addition, operability is superior because subsequent observation can be started quickly.

The first embodiment and the second embodiment can be combined with the present embodiment, the movement speed of the stage 25 in the Z direction or the XY direction can be controlled based on the observation power, and the difference in operation derived from the difference in observation power can be absorbed, after the lens unit is switched. In addition, the third embodiment can be combined with the present embodiment, and when a partial area is selected for an observation image, a control for selecting and switching to a lens unit with a magnifying power appropriate for the observation of the image included within this partial area can be performed.

As described above, even operators inexperienced with microscopes are capable of superior observation in an observation performed using a plurality of low-powered lens units and low-powered to high-powered, continuously variable zoom unit, in any of the foregoing embodiments.

Each embodiment of the present invention has been described above, with reference to the drawings. The microscope to which the present invention applies is not limited to each of the foregoing embodiments and the like, if the functions thereof are performed. In addition, the microscope to which the present invention applies can be a single device or a system or an integrated device comprises a plurality of devices. In other words, the present invention is not limited to each of the embodiments described above and various configurations and structures can be implemented without departing from the scope of the invention.

What is claimed is:

1. A microscope comprising:
    a switching mechanism which has a plurality of lens units disposed thereon, and which inserts only one selected lens unit out of the plurality of lens units into an observation light path and disposes all of the other non-selected lens units outside the observation light path; and
    a control unit which controls a movement speed of a stage, onto which a sample is placeable, in an optical axis direction according to an observation power of the selected lens unit inserted into the observation light path by the switching mechanism;
    wherein the plurality of lens units disposed on the switching mechanism include: (i) a plurality of fixed-power lens units which are lens units comprising a combination of imaging lenses and objective lenses, and whose observation powers when observing the sample mutually differ, and (ii) a zoom lens unit which has a continuously changeable observation power; and
    wherein the control unit is configured to acquire the observation power of the zoom lens unit based on a rotation angle of a motor driven to change the observation power of the zoom lens unit.

2. The microscope according to claim 1, wherein said control unit further controls the movement speed of said stage on a plane perpendicular to said optical axis direction according to said observation power of the selected lens unit inserted into the observation light path by the switching mechanism.

3. The microscope according to claim 1, wherein said switching mechanism inserts the one selected lens unit from among the plurality of fixed-power lens units and said zoom lens unit into said observation light path, by moving said observation light path.

4. The microscope according to claim 1, further comprising:
    a display unit for displaying an observation image of said sample;
    a partial area acquisition unit for acquiring setting results of a partial area configured for the observation image displayed in the display unit; and
    a selection unit for selecting one of said lens units according to the setting result of the partial area,
    wherein said switching mechanism inserts the lens unit selected by said selection unit into said observation light path.

5. The microscope according to claim 4, wherein said selection unit performs the selection of the lens unit based on: (i) the lens unit used when acquiring said observation image displayed in said display unit, and (ii) a size of said partial area.

6. The microscope according to claim 1, further comprising:
    a housing chamber in which said sample is houseable with said stage, and which is hermetically sealable;
    a detection unit which detects opening of the housing chamber; and
    a movement control unit which moves a position of said stage when the opening of the housing chamber is detected.

7. The microscope according to claim 6, wherein said movement control unit lowers said stage in the optical axis direction.

8. The microscope according to claim 6, wherein said movement control unit moves said stage outside of said housing chamber.

9. The microscope according to claim 6, wherein said detection unit further detects closing of said housing chamber, and
    wherein said movement control unit moves said stage to the position prior to the opening of said housing chamber when the closing of said housing chamber is detected.

10. The microscope according to claim 9, further comprising a focusing control unit which controls said switching mechanism to insert a lowest-powered lens unit from among said plurality of lens units into said observation light path, and controls the position of said stage to bring into focus an observation image of the sample within said housing chamber acquired after the closing of said housing chamber is detected.

11. A method of controlling a microscope, wherein the microscope comprises a switching mechanism which has a plurality of lens units disposed thereon, and which inserts only one selected lens unit out of the plurality of lens units into an observation light path and disposes all of the other non-selected lens units outside the observation light path, and wherein the plurality of lens units disposed on the switching mechanism include: (i) a plurality of fixed-power lens units which are lens units comprising a combination of imaging lenses and objective lenses, and whose observation powers when observing a sample mutually differ, and (ii) a zoom lens unit which has a continuously changeable observation power, the method comprising:

acquiring information on the observation power of the selected lens unit inserted into the observation light path; and controlling a movement speed of a stage, onto which the sample is placeable, in an optical axis direction according to the acquired information on the observation power of the selected lens unit, wherein, when the selected lens unit is the zoom lens unit, the information on the observation power of the zoom lens unit is acquired based on a rotation angle of a motor driven to change the observation power of the zoom lens unit.

12. A computer-readable recording medium having recorded thereon a program for controlling a microscope, wherein the microscope comprises a switching mechanism which has a plurality of lens units disposed thereon, and which inserts only one selected lens unit out of the plurality of lens units into an observation light path and disposes all of the other non-selected lens units outside the observation light path, and wherein the plurality of lens units disposed on the switching mechanism include: (i) a plurality of fixed-power lens units which are lens units comprising a combination of imaging lenses and objective lenses, and whose observation powers when observing a sample mutually differ, and (ii) a zoom lens unit which has a continuously changeable observation power, the program being executable by the microscope to perform functions comprising:

acquiring information on the observation power of the selected lens unit inserted into the observation light path; and controlling a movement speed of a stage, onto which the sample is placeable, in an optical axis direction according to the acquired information on the observation power of the selected lens unit, wherein, when the selected lens unit is the zoom lens unit, the information on the observation power of the zoom lens is acquired based on a rotation angle of a motor driven to change the observation power of the zoom lens unit.

* * * * *